US012594498B2

(12) United States Patent　　　　(10) Patent No.:　US 12,594,498 B2
　　　Takahashi et al.　　　　　　　　(45) Date of Patent:　Apr. 7, 2026

(54) RECORDING MEDIUM, CONTROL METHOD FOR SERVER APPARATUS, AND CONTROL METHOD FOR TERMINAL APPARATUS

(71) Applicant: Konami Digital Entertainment Co., Ltd., Tokyo (JP)

(72) Inventors: Hideyuki Takahashi, Tokyo (JP); Hiromori Hattori, Tokyo (JP); Hiroki Yamazaki, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 772 days.

(21) Appl. No.: 17/955,902

(22) Filed: Sep. 29, 2022

(65) Prior Publication Data

US 2023/0021839 A1　　Jan. 26, 2023

Related U.S. Application Data

(63) Continuation of application No. PCT/JP2020/044074, filed on Nov. 26, 2020.

(30) Foreign Application Priority Data

Mar. 31, 2020　(JP) ................................. 2020-061682

(51) Int. Cl.
　　*A63F 13/55*　　　(2014.01)
　　*A63F 13/35*　　　(2014.01)
　　(Continued)

(52) U.S. Cl.
　　CPC .............. *A63F 13/55* (2014.09); *A63F 13/35* (2014.09); *A63F 13/45* (2014.09); *A63F 13/533* (2014.09);
　　(Continued)

(58) Field of Classification Search
　　CPC ........ A63F 13/55; A63F 13/45; A63F 13/533; A63F 13/80; A63F 1/00; A63F 2003/00996
　　See application file for complete search history.

(56) References Cited

U.S. PATENT DOCUMENTS

2009/0005172 A1* 1/2009 Shibahara ............... A63F 13/46
　　　　　　　　　　　　　　　　　　　　　　463/42
2018/0304157 A1* 10/2018 Takatoku ............ A63F 13/2145

FOREIGN PATENT DOCUMENTS

JP　　2002-011245 A　　1/2002
JP　　2018-175635 A　　11/2018

OTHER PUBLICATIONS

Office Action issued in Korean patent application No. 10-2022-7037351, submission date Nov. 11, 2024.
(Continued)

*Primary Examiner* — Jasson H Yoo
(74) *Attorney, Agent, or Firm* — Sughrue Mion, PLLC

(57) ABSTRACT

A non-transitory computer readable recording medium having recorded therein a program executed by a processor of a server apparatus, the program causing the processor to: receive a first user's input for a competitive video game that uses (i) card objects of the first user of a first terminal apparatus, and (ii) enemy card objects of a second user of a second terminal apparatus; place, on a first deck zone, a first type card object of the first user, place, on a second deck zone, a second type card object and a third type card object; in response to a first user's input; allow the first type card object to be placed on a first area on which placement of the enemy card objects is not allowed; allow the second type card object placed on the second deck zone to be placed on a second area on which placement of at least one of the enemy card objects is allowed; and allow the third type
(Continued)

object card placed on the second deck zone to be placed on the first area or the second area.

12 Claims, 23 Drawing Sheets

(51) Int. Cl.
    *A63F 13/45*          (2014.01)
    *A63F 13/533*       (2014.01)
    *A63F 13/80*          (2014.01)

(52) U.S. Cl.
    CPC ........ *A63F 13/80* (2014.09); *A63F 2300/308* (2013.01); *A63F 2300/5546* (2013.01); *A63F 2300/63* (2013.01)

(56)            References Cited

OTHER PUBLICATIONS

Office Action dated Jan. 5, 2021 issued by the Japanese Patent Office in Japanese Application No. 2020-061682.
Office Action dated Oct. 6, 2020 issued by the Japanese Patent Office in Japanese Application No. 2020-061682.
Written Opinion of the International Searching Authority dated Jan. 12, 2021 in International Application No. PCT/JP2020/044074.
International Search Report dated Jan. 12, 2021 in International Application No. PCT/JP2020/044074.

\* cited by examiner

```
30 ─┐
     SERVER APPARATUS
31 ─┐                                                        ┌─ 32
310 ─┐  SERVER CONTROL SECTION        MEMORY SECTION
        GAME CONTROL SECTION
                                     CARD INFORMATION TABLE ─── TBL1
311 ─     FIELD MANAGER
                                     USER INFORMATION TABLE ─── TBL2
312 ─     CARD MANAGER
                                     USER-OWNED CARD
313 ─     GAME PROGRESSOR             INFORMATION TABLE ─── TBL3

MAIN DECK
                                     INFORMATION TABLE ─── TBL4
314 ─     DATA ACQUIRER
                                     EXTRA DECK
                                     INFORMATION TABLE ─── TBL5

33 ─   COMMUNICATION SECTION         ZONE INFORMATION TABLE ─── TBL6

GAME STATUS
                                     INFORMATION TABLE ─── TBL7

CARD STATUS
                                     INFORMATION TABLE ─── TBL8

CONTROL PROGRAM ─── PRGs
```

FIG. 11

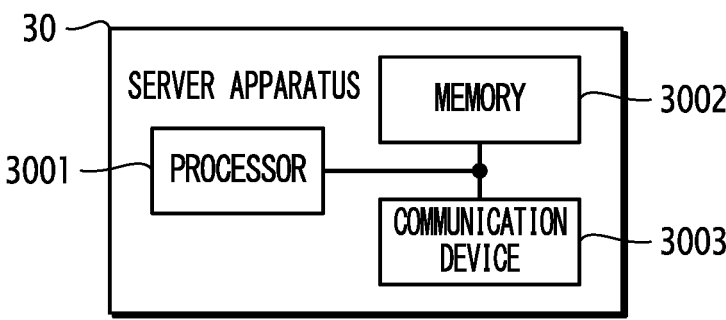

FIG. 14

TBL1

| CARD ID | CARD NAME | CARD INFORMATION | | | | | |
|---|---|---|---|---|---|---|---|
| | | CARD TYPE INFORMATION | | | | FORMAL SUMMONS INFORMATION | SPECIAL POWER INFORMATION |
| | | CARD TYPE INFORMATION | CARD HIGHER-LAYER ATTRIBUTE INFORMATION | CARD LOWER-LAYER ATTRIBUTE INFORMATION | | | |
| 11111 | GREEN GHOST | MONSTER | BASIC | NORMAL | | NORMAL | FORCED TRANSFER |
| 11112 | DARK UFO | MONSTER | EXTRA | LINK | | LINK | Null |
| 11113 | FLAME MAGICIAN | MONSTER | EXTRA | FUSION | | FUSION | REPOSITIONING |
| 11114 | HUGE MONSTER | MONSTER | BASIC | PENDULUM | | NORMAL | Null |
| 11115 | PRANK GHOST | MONSTER | COMPOSITE | FUSION PENDULUM | | FUSION | RESURRECTION |
| ... | ... | ... | ... | ... | | ... | ... |

FIG. 15

TBL1

| CARD ID | CARD INFORMATION | | | |
| | CARD PLACEMENT INFORMATION | | | |
| | INITIAL DECK PLACEMENT INFORMATION | INITIAL FIELD PLACEMENT INFORMATION | DESTRUCTION PLACEMENT INFORMATION | FORCED-TRANSFER PLACEMENT INFORMATION |
|---|---|---|---|---|
| 11111 | MAIN DECK ZONE / FACE-DOWN | MAIN MONSTER ZONE | GRAVEYARD ZONE / FACE-UP | HAND CARD ZONE / FACE-UP |
| 11112 | EXTRA DECK ZONE / FACE-DOWN | EXTRA MONSTER ZONE LINK ZONE | GRAVEYARD ZONE / FACE-UP | EXTRA DECK ZONE / FACE-DWON |
| 11113 | EXTRA DECK ZONE / FACE-DOWN | MAIN MONSTER ZONE EXTRA MONSTER ZONE | GRAVEYARD ZONE / FACE-UP | EXTRA DECK ZONE / FACE-DWON |
| 11114 | MAIN DECK ZONE / FACE-DOWN | MAIN MONSTER ZONE PENDULUM ZONE | EXTRA DECK ZONE / FACE-UP | HAND CARD ZONE / FACE-UP |
| 11115 | EXTRA DECK ZONE / FACE-DOWN | MAIN MONSTER ZONE EXTRA MONSTER ZONE | EXTRA DECK ZONE / FACE-UP | EXTRA DECK ZONE / FACE-DWON |
| ... | ... | ... | ... | ... |

FIG. 16

TBL1

| CARD ID | CARD INFORMATION | | |
| | CARD PLACEMENT INFORMATION | | |
| | RESURRECTION PLACEMENT INFORMATION | FACE-UP REPOSITION INFORMATION | FACE-DOWN REPOSITION INFORMATION |
|---|---|---|---|
| 11111 | MAIN MONSTER ZONE | Null | Null |
| 11112 | MAIN MONSTER ZONE | Null | EXTRA MONSTER ZONE LINK ZONE |
| 11113 | MAIN MONSTER ZONE | Null | MAIN MONSTER ZONE EXTRA MONSTER ZONE |
| 11114 | MAIN MONSTER ZONE | EXTRA MONSTER ZONE LINK ZONE | Null |
| 11115 | MAIN MONSTER ZONE | EXTRA MONSTER ZONE LINK ZONE | MAIN MONSTER ZONE EXTRA MONSTER ZONE |
| ... | ... | ... | ... |

FIG. 17

TBL1

| CARD ID | MONSTER CARD INFORMATION | | | MAGIC CARD INFORMATION | | TRAP EFFECT INFORMATION | |
| | LEVEL | ATTACK POWER | DEFENSE POWER | MAGIC EFFECT INFORMATION | MAGIC EFFECT ACTIVATION TIMING INFORMATION | TRAP EFFECT INFORMATION | TRAP EFFECT ACTIVATION TIMING INFORMATION |
|---|---|---|---|---|---|---|---|
| 11111 | 3 | 300 | 300 | Null | Null | Null | Null |
| 11112 | 5 | 2000 | 1200 | Null | Null | Null | Null |
| 11113 | 4 | 1200 | 800 | Null | Null | Null | Null |
| 11114 | 6 | 3000 | 2400 | Null | Null | Null | Null |
| 11115 | 2 | 400 | 100 | Null | Null | Null | Null |
| ... | ... | ... | ... | ... | ... | ... | ... |

The above columns are grouped under: CARD INFORMATION

TBL2

| USER ID | USER INFORMATION | |
| --- | --- | --- |
| | USER NAME | BATTLE HISTORY |
| u001 | HANAKO KONAMI | 10 WINS, 3 LOSSES |
| u002 | KAZUO TANAKA | 25 WINS, 10 LOSSES |
| u003 | JOHICHI MATSUMOTO | 6 WINS, 12 LOSSES |
| ⋮ | ⋮ | ⋮ |

TBL3-m

| USER-OWNED CARD INFORMATION | |
| --- | --- |
| USER-OWNED CARD ID | CARD ID |
| c001 | 11111 |
| c002 | 11111 |
| c003 | 12345 |
| ⋮ | ⋮ |

FIG. 20

TBL4-m

| MAIN DECK ID | MAIN DECK CONFIGURATION INFORMATION |
|---|---|
| d001 | c001, c002, c015, · · · |
| d002 | c003, c004, c008, · · · |
| d003 | c005, c006, c007, · · · |
| ⋮ | ⋮ |

FIG. 21

TBL5-m

| EXTRA DECK ID | EXTRA DECK CONFIGURATION INFORMATION |
|---|---|
| e001 | c021, c022, c035, · · · |
| e002 | c023, c024, c028, · · · |
| e003 | c045, c046, c057, · · · |
| ⋮ | ⋮ |

FIG. 22

TBL6

| ZONE ID | ZONE INFORMATION | | |
| --- | --- | --- | --- |
| | AFFILIATION FIELD INFORMATION | ZONE TYPE INFORMATION | ZONE POSITION INFORMATION |
| z001 | Fe | EXTRA MONSTER ZONE | (30, 50) |
| z002 | Fe | EXTRA MONSTER ZONE | (50, 50) |
| z003 | Fu[m1] | FIELD ZONE | (10, 40) |
| ⋮ | ⋮ | ⋮ | ⋮ |

FIG. 23

_TBL7_

| GAME STATUS INFORMATION | FIRST PLAYER INFORMATION | USER ID | u001 |
|---|---|---|---|
| | | USER NAME | HANAKO KONAMI |
| | | LIFE POINTS | 4000 |
| | | MAIN DECK IN USE INFORMATION | d002 |
| | | EXTRA DECK IN USE INFORMATION | e001 |
| | SECOND PLAYER INFORMATION | USER ID | u002 |
| | | USER NAME | KAZUO TANAKA |
| | | LIFE POINTS | 3800 |
| | | MAIN DECK IN USE INFORMATION | d004 |
| | | EXTRA DECK IN USE INFORMATION | e001 |
| | TURN INFORMATION | THE NUMBER OF TURNS | 3 |
| | | USER AT CURRENT TURN | u001 |

FIG. 24

TBL8-q

| PLAY-USED CARD ID | CARD STATUS INFORMATION | | |
|---|---|---|---|
| | CARD PLACEMENT ZONE INFORMATION | CARD PLACEMENT MODE INFORMATION | CARD PLACEMENT STATUS INFORMATION |
| c003 | z021 | FACE-DOWN | INITIAL DECK PLACEMENT STATUS |
| c004 | z011 | FACE-UP | DESTRUCTION PLACEMENT STATUS |
| c008 | z017 | FACE-UP | RESURRECTION PLACEMENT STATUS |
| c021 | z001 | FACE-UP | INITIAL FIELD PLACEMENT STATUS |
| c022 | z022 | FACE-DOWN | FACE-DOWN REPOSITION STATUS |
| ⋮ | ⋮ | ⋮ | ⋮ |

RECORDING MEDIUM, CONTROL METHOD FOR SERVER APPARATUS, AND CONTROL METHOD FOR TERMINAL APPARATUS

CROSS REFERENCE TO RELATED APPLICATIONS

This application is a Continuation Application of PCT Application No. PCT/JP2020/044074, filed Nov. 26, 2020, and is based on, and claims priority from Japanese Patent Application No. 2020-061682, filed Mar. 31, 2020, the entire contents of each of which are incorporated herein by reference.

BACKGROUND

Field of the Invention

The present disclosure relates to recording mediums, server apparatuses, terminal apparatuses, control methods for server apparatuses, and control methods for terminal apparatuses.

Description of Related Art

Techniques for computer card games are known in which one user having a deck of card objects plays against another user having another deck of card objects (e.g., Japanese Patent Application Laid-Open Publication No. 2002-011245).

In a conventional technique, a user can place any card object from among the user's deck of card objects on a specific area of a field to attack another user's card objects. However, conventional techniques have no limit to the types of card objects that can be placed on the specific area of the field by the users. For this reason, the outcome of the card game will depend on the types of, and how many, card objects are included in the deck the user has. As a result, in some cases, the users are not required to consider numerous strategies for the card game, and thus the card game is not interesting.

SUMMARY

The present disclosure has been made in view of the foregoing circumstances, and it provides a technique for requiring strategies for a card game more than in conventional techniques.

To achieve the stated object, a recording medium according to one aspect of the present disclosure is a non-transitory computer readable recording medium having recorded therein a program executed by at least one processor of a server apparatus, the program causing the at least one processor to: receive a user input made by a first user for a competitive video game, the competitive video game using: a plurality of card objects to be manipulated by the first user of a first terminal apparatus that is configured to communicate with the server apparatus; and a plurality of enemy card objects to be manipulated by a second user of a second terminal apparatus that is configured to communicate with the server apparatus; place, on a first deck zone, a first type card object from among the plurality of card objects to be manipulated by the first user; place, on a second deck zone, a second type card object and a third type card object from among the plurality of card objects to be manipulated by the first user; allow the first type card object to be placed on a first area on which placement of the plurality of enemy card objects to be manipulated by the second user is not allowed, in response to a user input made by the first user; allow the second type card object placed on the second deck zone to be placed on a second area on which placement of at least one of the plurality of enemy card objects to be manipulated by the second user is allowed, in response to a user input made by the first user; and allow the third type object card placed on the second deck zone to be placed on the first area or the second area, in response to a user input made by the first user.

A recording medium according to one aspect of the present disclosure is a non-transitory computer readable recording medium having recorded therein a program executed by at least one processor of a first terminal apparatus, the program causing the at least one processor to: receive a user input made by a first user for a competitive video game, the competitive video game using: a plurality of card objects to be manipulated by the first user of the first terminal apparatus; and a plurality of enemy card objects to be manipulated by a second user of a second terminal apparatus that is configured to communicate with the first terminal apparatus; place, on a first deck zone, a first type card object from among the plurality of card objects to be manipulated by the first user; place, on a second deck zone, a second type card object and a third type card object from among the plurality of card objects to be manipulated by the first user; allow the first type card object to be placed on a first area on which placement of the plurality of enemy card objects to be manipulated by the second user is not allowed, in response to a user input made by the first user; allow the second type card object placed on the second deck zone to be placed on a second area on which placement of at least one of the plurality of enemy card objects to be manipulated by the second user is allowed, in response to a user input made by the first user; and allow the third type object card placed on the second deck zone to be placed on the first area or the second area, in response to a user input made by the first user.

A server apparatus according to one aspect of the present disclosure is a server apparatus configured to communicate with a first terminal apparatus and a second terminal apparatus, the server apparatus including: a memory that stores instructions and; at least one processor that implements the instructions to: receive a user input made by a first user for a competitive video game, the competitive video game using: a plurality of card objects to be manipulated by the first user of the first terminal apparatus; and a plurality of enemy card objects to be manipulated by a second user of the second terminal apparatus; place, on a first deck zone, a first type card object from among the plurality of card objects to be manipulated by the first user; place, on a second deck zone, a second type card object and a third type card object from among the plurality of card objects to be manipulated by the first user; allow the first type card object to be placed on a first area on which placement of the plurality of enemy card objects to be manipulated by the second user is not allowed, in response to a user input made by the first user; allow the second type card object placed on the second deck zone to be placed on a second area on which placement of at least one of the plurality of enemy card objects to be manipulated by the second user is allowed, in response to a user input made by the first user; and allow the third type object card placed on the second deck zone to be placed on the first area or the second area, in response to a user input made by the first user.

A terminal apparatus according to one aspect of the present disclosure is a terminal apparatus including: a memory that stores instructions and; at least one processor that implements the instructions to: receive a user input made by a first user for a competitive video game, the competitive video game using: a plurality of card objects to be manipulated by the first user of the terminal apparatus; and a plurality of enemy card objects to be manipulated by a second user of another terminal apparatus that is configured to communicate with the terminal apparatus; place, on a first deck zone, a first type card object from among the plurality of card objects to be manipulated by the first user; place, on a second deck zone, a second type card object and a third type card object from among the plurality of card objects to be manipulated by the first user; allow the first type card object to be placed on a first area on which placement of the plurality of enemy card objects to be manipulated by the second user is not allowed, in response to a user input made by the first user; allow the second type card object placed on the second deck zone to be placed on a second area on which placement of at least one of the plurality of enemy card objects to be manipulated by the second user is allowed, in response to a user input made by the first user; and allow the third type object card placed on the second deck zone to be placed on the first area or the second area, in response to a user input made by the first user.

A control method for a server apparatus according to one aspect of the present disclosure is a computer-implemented control method for a server apparatus including: receiving a user input made by a first user for a competitive video game, the competitive video game using: a plurality of card objects to be manipulated by the first user of a first terminal apparatus that is configured to communicate with the server apparatus; and a plurality of enemy card objects to be manipulated by a second user of a second terminal apparatus that is configured to communicate with the server apparatus; placing, on a first deck zone, a first type card object from among the plurality of card objects to be manipulated by the first user; placing, on a second deck zone, a second type card object and a third type card object from among the plurality of card objects to be manipulated by the first user; allowing the first type card object to be placed on a first area on which placement of the plurality of enemy card objects to be manipulated by the second user is not allowed, in response to a user input made by the first user; allowing the second type card object placed on the second deck zone to be placed on a second area on which is allowed to place at least one of the plurality of enemy card objects to be manipulated by the second user, in response to a user input made by the first user; and allowing the third type object card placed on the second deck zone to be placed on the first area or the second area, in response to a user input made by the first user.

A control method for a terminal apparatus according to one aspect of the present disclosure is a computer-implemented control method for a terminal apparatus including: receiving a user input made by a first user for a competitive video game, the competitive video game using: a plurality of card objects to be manipulated by the first user of the terminal apparatus; and a plurality of enemy card objects to be manipulated by a second user of another terminal apparatus that is configured to communicate with the terminal apparatus; placing, on a first deck zone, a first type card object from among the plurality of card objects to be manipulated by the first user; placing, on a second deck zone, a second type card object and a third type card object from among the plurality of card objects to be manipulated by the first user; allowing the first type card object to be placed on a first area on which placement of the plurality of enemy card objects to be manipulated by the second user is not allowed, in response to a user input made by the first user; allowing the second type card object placed on the second deck zone to be placed on a second area on which placement of at least one of the plurality of enemy card objects to be manipulated by the second user is allowed, in response to a user input made by the first user; and allowing the third type object card placed on the second deck zone to be placed on the first area or the second area, in response to a user input made by the first user.

BRIEF DESCRIPTION OF THE DRAWINGS

FIG. 3 illustrates an example of a field Fd.

FIG. 10 is a functional block diagram showing an example of a configuration of a server apparatus 30.

FIG. 11 illustrates an example of a hardware configuration of the server apparatus 30.

FIG. 14 illustrates an example of a data structure of a card information table TBL1.

FIG. 15 illustrates an example of the data structure of the card information table TBL1.

FIG. 16 illustrates an example of the data structure of the card information table TBL1.

FIG. 17 illustrates an example of the data structure of the card information table TBL1.

FIG. 20 illustrates an example of a data structure of a main deck information table TBL4-$m$.

FIG. 21 illustrates an example of a data structure of an extra deck information table TBL5-$m$.

FIG. 22 illustrates an example of a data structure of a zone information table TBL6.

FIG. 23 illustrates an example of a data structure of a game status information table TBL7.

FIG. 24 illustrates an example of a data structure of each card status information table TBL8-$q$.

DESCRIPTION OF EMBODIMENT

Hereinafter, modes for carrying out the present disclosure will be described with reference to the drawings. In each diagram, the dimensions and scale of each element are appropriately different from actual ones. The embodiment described below is a preferable specific example of the present disclosure. Accordingly, various technically preferable limitations are applied. However, the scope of the present disclosure is not limited to these modes unless there is a specific description limiting the present disclosure.

A. Embodiment

Description will be given of an embodiment of the present disclosure.

1. Overview of Game System

Figure 1:
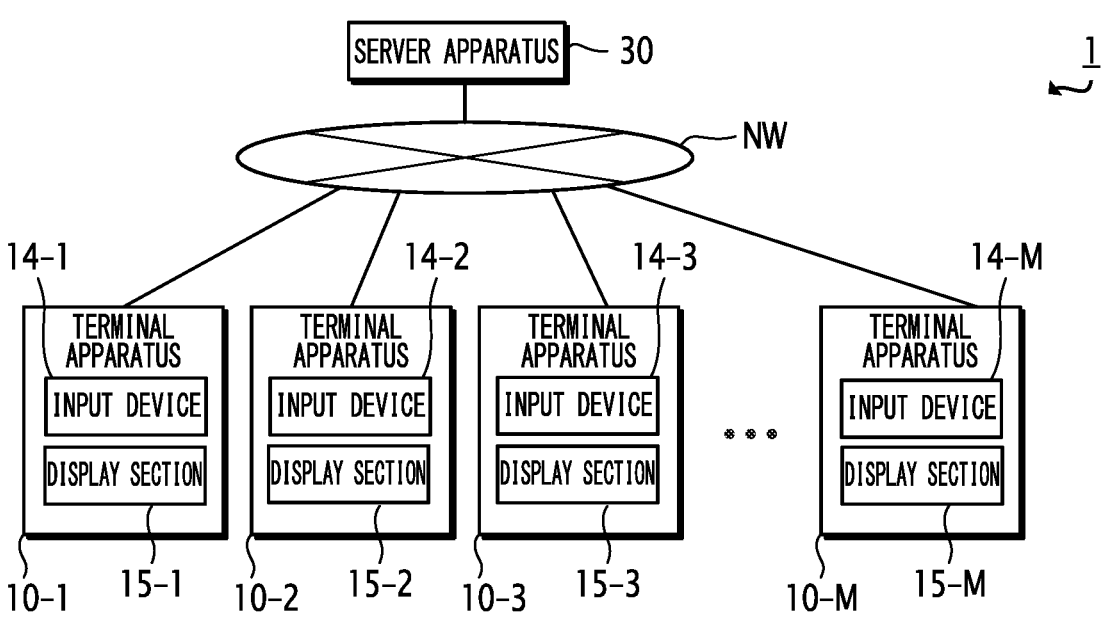
FIG. 1 illustrates an overview of a game system 1 according to this embodiment of the present disclosure.

FIG. 1 illustrates an overview of a game system 1 according to this embodiment. The overview of the game system 1 will be described with reference to FIG. 1.

As shown in FIG. 1, the game system 1 includes a server apparatus 30 that executes a card game (an example of "video game"), and terminal apparatuses 10-1 to 10-M that communicate with the server apparatus 30 via a network NW. Where "M" is a natural number and is 2 or more. Hereinafter, m-th terminal apparatus 10 of the terminal apparatuses 10-1 to 10-M is referred to as a terminal apparatus 10-$m$. Where "m" is a natural number satisfying $1 \le m \le M$.

In this embodiment, an example will be assumed that each terminal apparatus 10 is a smartphone. However, any information processing devices may be applied to the terminal apparatuses 10. Examples of a terminal apparatus 10 include a home gaming device, a professional gaming device in a store or an amusement facility and a stationary personal computer (an information processing device).

In this embodiment, the server apparatus 30 progresses the card game based on the user input made by a user U-m of the terminal apparatus 10-$m$ using its input device 14-$m$. The server apparatus 30 transmits information relating to the card game executed on the server apparatus 30 to the terminal apparatus 10-$m$. The terminal apparatus 10-$m$ displays, on its display section 15-$m$, a game image G-m based on information relating to the card game transmitted from the server apparatus 30. This allows the user U-m of the terminal apparatus 10-$m$ to play the card game executed on the server apparatus 30.

In this embodiment, description will be given in which a user U-m1 of the terminal apparatus 10-$m$1 and a user U-m2 of the terminal apparatus 10-$m$2 play against each other for the card game. Where the "m1" is a natural number satisfying $1 \le m1 \le M$, and the "m2" is a natural number other than m1 satisfying $1 \le m2 \le M$. Hereinafter, the m1 and m2 are collectively referred to as a value q.

In this embodiment, the server apparatus 30 progresses the card game based on the following user inputs: (i) a user input made by the user U-m1 to the input device 14-$m$1 of the terminal apparatus 10-$m$1; and (ii) a user input made by the user U-m2 to the input device 14-$m$2 of the terminal apparatus 10-$m$2. The server apparatus 30 transmits information relating to the card game executed thereon to the terminal apparatuses 10-$m$1 and 10-$m$2. Thereafter, the terminal apparatus 10-$m$1 displays, on its display section 15-$m$1, a game image G-m1 based on the information relating to the card game transmitted from the server apparatus 30. Similarly, the terminal apparatus 10-$m$2 displays, on its display section 15-$m$1, a game image G-m2 based on the information relating to the card game transmitted from the server apparatus 30. This allows two users, the user U-m1 of the terminal apparatus 10-$m$1 and the user U-m2 of the terminal apparatus 10-$m$2, to play against each other in the card game.

2. Overview of Card Game

Description will be given of an overview of a card game according to this embodiment with reference to FIGS. 2 to 5.

The card game according to this embodiment is a video game in which the users U-m1 and U-m2, each having virtual cards C, play against each other, and either will be the winner based on the results of the play. The virtual cards C are displayed as images on the display section 15-$m$ of the terminal apparatus 10-$m$. Hereinafter, the virtual cards C are simply referred to as "cards C." The cards C of the user U-m1 are referred to as "cards C-1," and the cards C of the user U-m2 are referred to as "cards C-2."

As will be described later, the cards C used in the card game according to this embodiment are classified into three types: Monster cards Cx; Magic Cards Cy; and Trap Cards Cz. In this embodiment, the Monster Cards Cx are classified into three types: Basic Monster Cards CK; Extra Monster Cards CE: and Composite Monster Cards CF. The Basic Monster Cards CK are classified into four types: Normal Monster Cards CKT; Effect Monster Cards CKK, Ritual Monster Cards CKG, and Pendulum Monster Cards CKP. Hereinafter, Basic Monster Cards CK other than the Pendulum Monster Cards CKP (i.e., the Normal Monster Cards CKT, the Effect Monster Cards CKK and Ritual Monster Cards CKG) are collectively referred to as "Standard Monster Cards CKH."

As will be described later, in this embodiment, the Extra Monster Cards CE are classified into four types: Fusion Monster Cards CEY; Synchro Monster Cards CES; Exes Monster Cards CEE; and Link Monster Cards CEL. Hereinafter, Extra Monster Cards CE other than the Link Monster Cards CEL (i.e., the Fusion Monster Cards CEY, the Synchro Monster Cards CES, and the Exes Monster Cards CEE) are collectively referred to as "Specific Monster Cards CET."

As will be described later, the Composite Monster Cards CF are classified into three types: Fusion Pendulum Monster Cards CFY, Synchro Pendulum Monster Cards CFS, and Exes Pendulum Monster Cards CFE.

Although the Magic Cards Cy are classified into multiple types thereof, and the Trap Cards Cz are also classified into multiple types thereof, detailed description is omitted in this embodiment.

In this embodiment, before a play with a card game, a user U-q selects cards C-q to be used for the play from among cards C-q of the user U-q, to construct a deck D-q including the selected cards C-q. As will be described later, in this embodiment, the deck D-q includes a Main Deck DM-q and an Extra Deck DE-q. In the card game according to this embodiment, two users play against each other, one of whom is the user U-m1 who constructed a deck D-m1 of cards C-1, and the other of whom is the user U-m2 who constructed a deck D-m2 of cards C-2.

In this embodiment, the cards C-1 included in the deck D-m1 constructed by the user U-m1 are an example of "card objects," and the cards C-2 included in the deck D-m2 constructed by the user U-m2 are an example of an "enemy card objects."

In this embodiment, the card game is played in a turn-based system in which the users U-m1 and U-m2 take turns. At a user's U-m1 turn, the card game progresses based on a user input made by the user U-m1 to the terminal apparatus 10-m1. At a user's U-m2 turn, the card game progresses based on a user input made by the user U-m2 to the terminal apparatus 10-m2.

Figure 2:
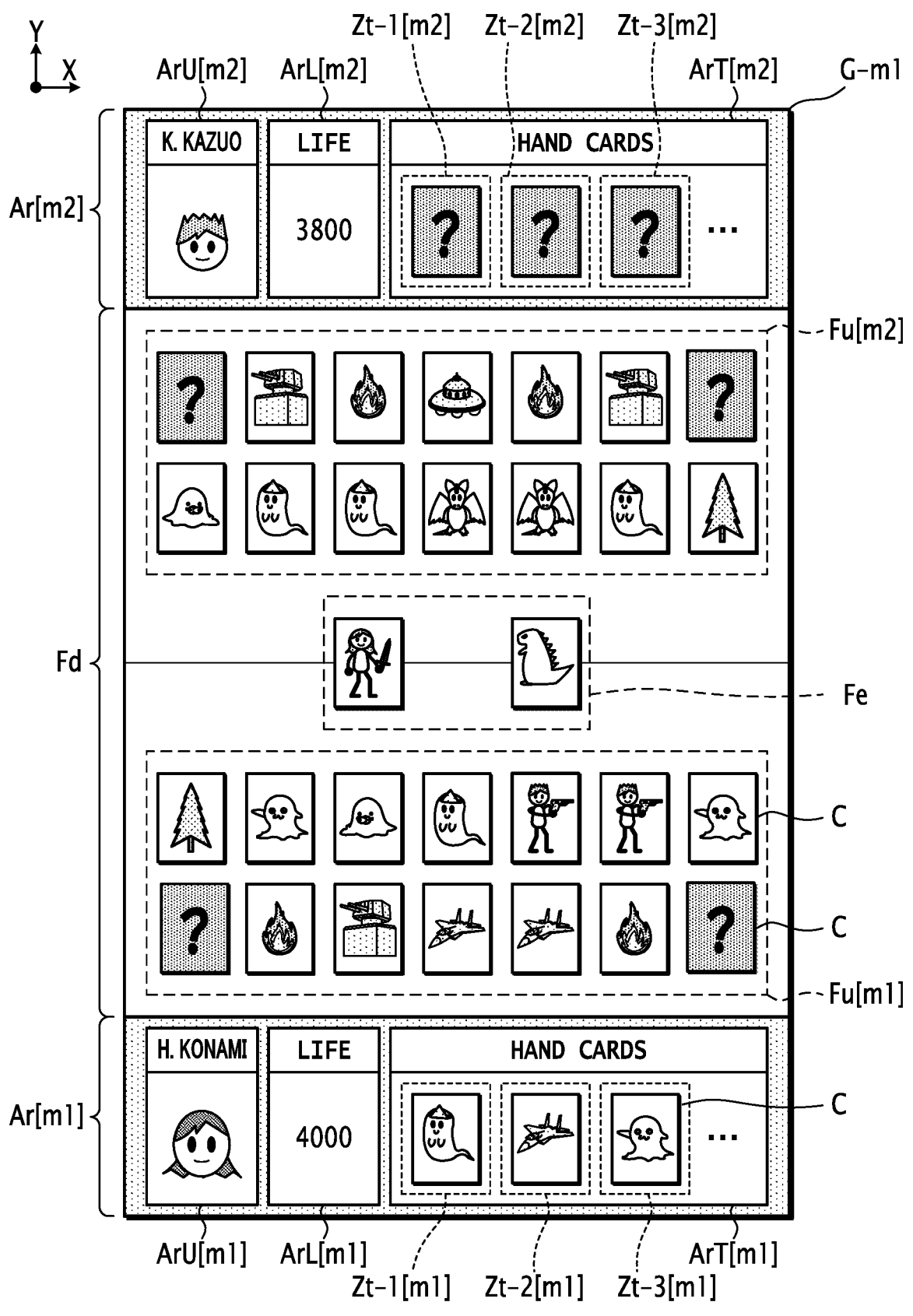
FIG. 2 illustrates an example of a game image G-m1.

FIG. 2 illustrates an example of a game image G-m1 displayed on the display section 15-m1 of the terminal apparatus 10-m1 during a play of the card game carried out by the two users; the user U-m1 operating the terminal apparatus 10-m1; and the user U-m2 operating the terminal apparatus 10-m2.

As shown in FIG. 2, the game image G-m1 includes a field Fd that is used to place cards included in decks D-q of users U-q, and user information display areas Ar[q] that are used to display information relating to the users U-q.

As shown in FIG. 2, the field Fd includes a user field Fu[m1], a user field Fu[m2] and a shared field Fe. The user field Fu[m1] is an area in which cards C-1 included in the deck D-m1 constructed by the user U-m1 can be placed. The user field Fu[m2] is an area in which cards C-2 included in the deck D-m2 constructed by the user U-m2 can be placed. The shared field Fe is an area in which both of the following cards can both be placed: the cards C-1 included in the deck D-m1 constructed by the user U-m1; and cards C-2 included in the deck D-m2 constructed by the user U-m2.

As shown in FIG. 2, a user information display area Ar[q] includes a user profile display area ArU[q], a life point display area ArL[q] and a hand card area ArT[q]. Among these areas, a user name and a profile image of the user U-q are shown in the user profile display area ArU[q]. Life points of the user U-q are shown in the life point display area ArL[q]. In the card game according to this embodiment, when the user U-m2 is attacked by the user Um-1 with the cards C-1, the life points of the user U-m2 decrease. The minimum of the life points is "0." As a result of the attack, when the life points of the user U-m2 reaches "0," the user U-m1 defeats the user U-m2.

Similarly, the card game according to this embodiment, when the user U-m1 is attacked by the user U-m2 with the cards C-2, the life points of the user U-m1 decrease. The minimum of the life points is "0." As a result of the attack, when the life points of the user U-m1 reaches "0," the user U-m2 defeats the user U-m1.

The cards C-q of the user U-q, as hand cards, are placed on the hand card area ArT[q]. The hand cards will be described below.

Figure 3:
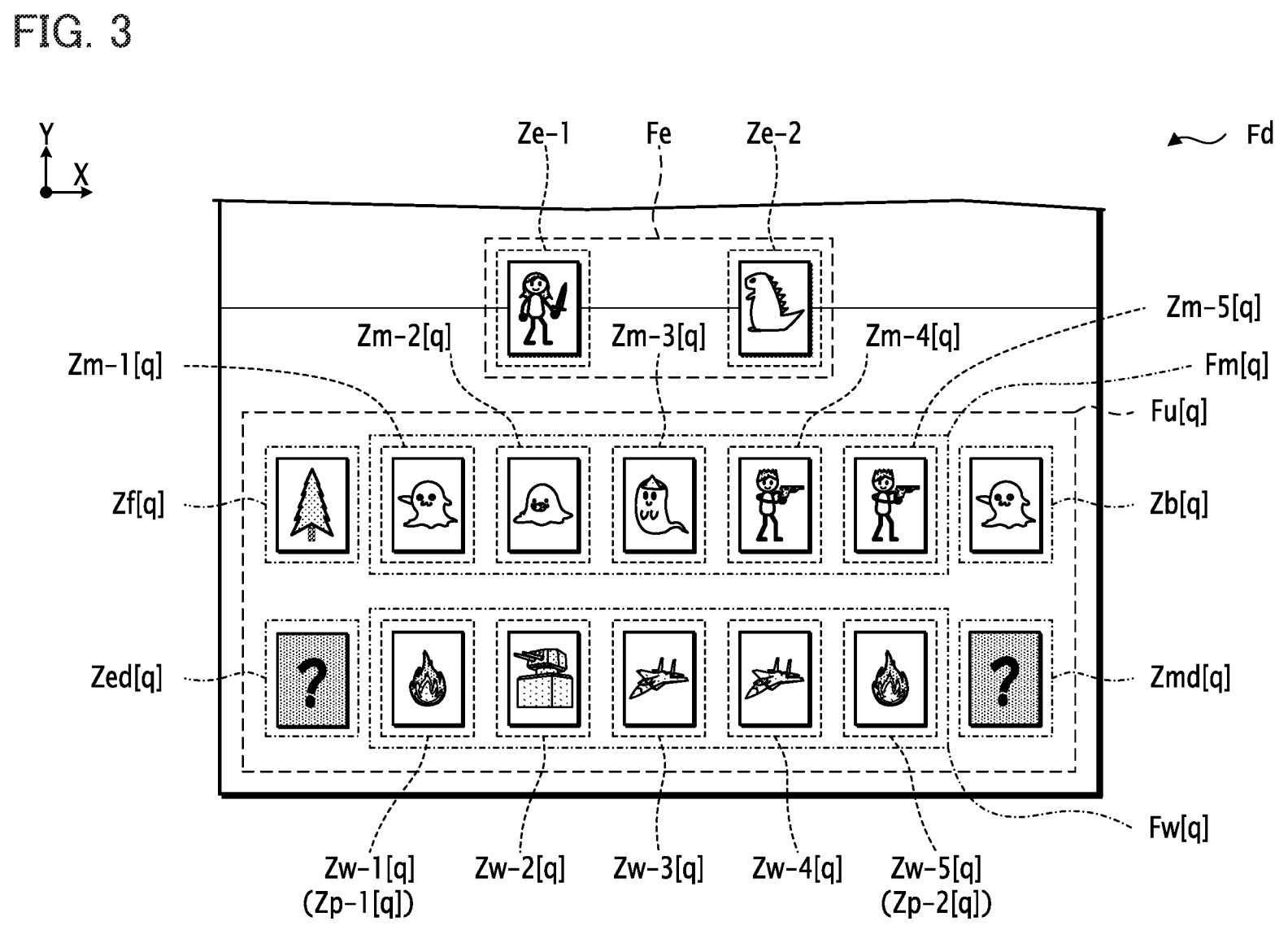

FIG. 3 illustrates an example of the user field Fu[q] and the shared field Fe included in the game image G-q.

As shown in FIG. 3, in this embodiment, the user field Fu[q] includes five Main Monster Zones Zm-1[$q$] to Zm-5[$q$], five Magic Trap Zones Zw-1[$q$] to Zw-5[$q$], one Main Deck Zone Zmd[q], one Extra Deck Zone Zed[q], one Field Zone Zf[q], and one Graveyard Zone Zb[q].

Hereinafter, when the five Main Monster Zones Zm-1[$q$] to Zm-5[$q$] are not required to be distinguished from each other, each of them is referred to as "Main Monster Zone Zm[q]." An area of the user field Fu[q] that includes the five Main Monster Zones Zm-1[$q$] to Zm-5[$q$] is referred to as "Main Monster Field Fm[q]." When the five Magic Trap Zones Zw-1[$q$] to Zw-5[$q$] are not required to be distinguished from each other, each of them is referred to as "Magic Trap Zone Zw[q]." An area of the user field Fu[q] that includes the five Magic Trap Zones Zw-1[$q$] to Zw-5[$q$] is referred to as "Magic Trap Field Fw[q]."

A Main Monster zone Zm[q] is an area that is used to place a Monster Card Cx. As will be described later, in some cases, Link Monster Cards CEL, Pendulum Monster Cards CKP, and Composite Monster Cards CF cannot be placed on the Main Monster Zones Zm[q].

When a Monster Card Cx is placed on a Main Monster Zone Zm[q], a monster corresponding to the Monster Card Cx will be brought to a position based on the Monster Card Cx in the field Fd. Hereinafter, the act of bringing a monster to the field Fd is described as "summoning a monster."

In the card game according to this embodiment, at a user's U-m1 turn, the user U-m1 can place, on the field Fd, a Monster Card Cx included in the deck D-m1 of the user U-m1 to summon a monster corresponding to the Monster Card Cx. Similarly, at a user's U-m2 turn, the user U-m2 can place, on the field Fd, a Monster Card Cx included in the deck D-m2 of the user U-m2 to summon a monster of the Monster Card Cx.

Thereafter at the user's U-m1 turn, the monster summoned by the user U-m1 can battle against the monster summoned by the user U-m2. Similarly, at the user's U-m2 turn, the monster summoned by the user U-m2 can battle against the monster summoned by the user U-m1.

When a first monster of the two defeats a second monster, the first monster will remain on the field Fd, and the second monster will be destroyed (an example of "first effect"). As will be described later, each monster has attack and defense powers. In this embodiment, when a first monster of the two attacks a second monster, or when the attack power of the first monster is greater than the defense power of the second monster, it is determined that the first monster has defeated the second monster.

However, this embodiment is not limited to such an aspect. For example, when a first monster of the two attacks a second monster, or when the attack power of the first monster is greater than the attack power of the second monster, it may be determined that the first monster has defeated the second monster. Furthermore, when either monster is destroyed, the destroyed monster may be determined to be unable to battle against the other monster.

Hereinafter, for clarity, the phrase "a battle between a monster summoned by a Monster Card Cx and a monster summoned by another Monster Card Cx" is simply described as "a battle between a Monster Card Cx and another Monster Card Cx." Furthermore, the phrase "a monster summoned by a Monster Card Cx is destroyed" is simply described as "Monster Card Cx is destroyed."

A Magic Trap Zone Zw[q] is an area for placing a Magic Card Cy and a Trap Card Cz. In this embodiment, some Magic Trap Zones Zw[q] serve as the Pendulum Zones Zp[q] from among the five Magic Trap Zones Zw-1[$q$] to Zw-5[$q$]. Each Pendulum Zone Zp[q] is an area that is used to place a Pendulum Monster Card CKP. In this embodiment, the Magic Trap Zones Zw-1[$q$] and Zw-5[$q$] serve as the Pendulum Zones Zp[q]. Hereinafter, in some cases, the Magic Trap Zone Zw-1[$q$] is referred to as a Pendulum Zone Zp-1[$q$], and the Magic Trap Zone Zw-5[$q$] is referred to as a Pendulum Zone Zp-2[$q$].

The Field Zone Zf[q] is an area that is used to place a Field Magic Card from among the Magic Cards Cy. For example, during a battle between two monsters, a first monster corresponding to the Monster Card Cx placed on the field Fd by the user U-m1, and a second monster corresponding to the Monster Card Cx placed on the field Fd by the user U-m2, when the user U-m1 places a Field Magic Card on the Field Zone Zf[q], the first monster can develop the battle advantageously by this Field Magic Card.

The Graveyard Zone Zb[q] is as follows: When a monster corresponding to either a Standard Monster Card CKH or an Extra Monster Card CE is destroyed, the Graveyard Zone Zb[q] is an area that is used to place a Monster Card Cx corresponding to the destroyed monster. When a Magic Card Cy placed on the field Fd is no longer available because the Magic Card Cy has lost its effect, the Magic Card Cy will be placed on the Graveyard Zone Zb[q]. Similarly, when a Trap Card Cz placed on the field Fd is no longer available because the Trap Card Cz has lost its effect, it will be placed on the Graveyard Zone Zb[q].

The Main Deck Zone Zmd[q] is an area that is used to place cards C-q included in the Main Deck DM-q at the beginning of a battle with two user's cards; cards C-1 included in the deck D-m1 constructed by the user U-m1; and cards C-2 included in the deck D-m2 constructed by the user U-m2. In this embodiment, the Main Deck DM-q includes Basic Monster Cards CK, Magic Cards Cy and Trap Cards Cz, which are ones of the cards C-q.

The Extra Deck Zone Zed[q] is an area that is used to place cards C-q included in the Extra Deck DE-q constructed by the user U-q at the beginning of a battle with two user's cards: cards C-1 included in the user's deck D-m1 constructed by the user U-m1; and cards C-2 included in the user's deck D-m2 constructed by the user U-m2. In this embodiment, the Extra Deck DE-q includes Extra Monster Cards CE and Composite Monster Cards CF, which are from among the cards C-q.

As shown in FIG. 3, the shared field Fe includes two Extra Monster Zones Ze-1 and Ze-2. Hereinafter, each of the two Extra Monster Zones Ze-1 and Ze-2 is referred to as "Extra Monster Zone Ze." In this embodiment, there are two Extra Monster Zones Ze included in the shared field Fe, but the number of the Extra Monster zones Ze included in the shared field Fe may be less than that of the Main Monster Zones Zm[q] included in a Main Monster Field Fm[q].

The Extra Monster Zones Ze are each an area that is used to place an Extra Monster Card CE or a Composite Monster Card CF. However, as will be described later, when a Pendulum Monster Card CKP is in a predetermined state, it can be placed on the Extra Monster Zone Ze.

Basically, the user U-q can place a card C-q only for one of the two Extra Monster Zones Ze. However, when an extra link is made by a Link Monster Card CEL of the user U-q, the user U-q can place cards C-q on both two Extra Monster Zones Ze.

As shown in FIG. 2, a hand card area ArT[q] includes Hand Card Zones Zt[q]. Each Hand Card Zone Zt[q] is an area that is used to place a hand card of the user U-q.

In this embodiment, when a Monster Card Cx of the user U-m1 is placed on a Main Monster Zone Zm[m1] or an Extra Monster Zone Ze, the Monster Card Cx can attack the user U-m2 or the card C-2 thereof. Similarly, when a Monster Card Cx of the user U-m2 is placed on a Main Monster Zone Zm[m2] or an Extra Monster Zone Ze, the Monster Card Cx can attack the user U-m1 or cards C-1 thereof.

When a Monster Card Cx of the user U-m1 is placed on any of the Graveyard Zone Zb[m1], the Main Deck Zone Zmd[q] and the Extra Deck Zone Zed[q], the Monster Card Cx cannot attack the user U-m2 or cards C-2 thereof. Similarly, when a Monster Card Cx of the user U-m2 is placed on any of the Graveyard Zone Zb[m1], the Main Deck Zone Zmd[q] and the Extra Deck Zone Zed[q], the Monster Card Cx cannot attack the user U-m1 or cards C-1 thereof.

In this embodiment, when a Magic Card Cy of the user U-q is placed on a Magic Trap Zone Zw[q] or the Field Zone Zf[q], the Magic Card Cy takes effect. Furthermore, when a Trap Card Cz of the user U-q is placed on a Magic Trap Zone Zw[q], the Trap Card Cz takes effect.

In contrast, when a Magic Card Cy of the user U-q is placed on the Graveyard Zone Zb[q], the Magic Card Cy cannot take effect. Furthermore, when a Trap Card Cz of the user U-q is placed on the Graveyard Zone Zb[q], the Trap Card Cz cannot take effect.

In this embodiment, Standard Monster Cards CKH included in the cards C-1 are an example of "first type card object." Link Monster Cards CEL included in the cards C-1 are an example of "second type card object." Specific Monster Cards CET included in the cards C-1 are an example of "third type card object." Composite Monster Cards CF included in the cards C-1 are an example of "fourth type card object."

In this embodiment, the Main Deck Zone Zmd[m1] of the user U-m1 on which a Main Deck DM-m1 including Standard Monster Cards CKH is to be placed is an example of "first deck zone." The Extra Deck Zone Zed[m1] of the user U-m1 on which an Extra deck DE-m1 including Link Monster Cards CEL, Specific Monster Cards CET and Composite Monster Cards CF is to be placed is an example of "second deck zone."

In this embodiment, the Main Monster Field Fm[m1] of the user U-m1 on which cards C-1 can be placed but cards C-2 cannot be placed is an example of "first area." The shared field Fe on which both cards C-1 and C-2 can be placed is an example of a "second area."

Next, description will be given of what is displayed on a card C and of how the card C is placed with reference to FIGS. 4 and 5.

In this embodiment, each card C has the face (an example of "second surface") and the back (an example of "first surface"). Each card C can be placed on the field Fd or the user information display area Ar[q] in different ways, such as, face-up, face-down and half face-up. The term "face-up" is a way of placing a card C such that the face of the card C is visible to both the users U-m1 and U-m2 during they play against each other. The term "face-down" is a way of placing a card C such that the back of the card C is visible to both the users U-m1 and U-m2 during the play. In other words, the term "face-down" is a way of placing the card C such that the face of the card C is not visible to both the users U-m1 and U-m2 during the play. The term "half face-up" is a way of placing a card C-1 or a card C-2 such that the following (i) to (iv) are satisfied during the users U-m1 and U-m2 play against each other; (i) the face of the card C-1 is visible to the user U-m1, (ii) the back of the card C-1 is visible to the user U-m2, (iii) the face of the card C-2 is visible to the user U-m2, and (iv) the back of the card C-2 is visible to the user U-m1.

Figure 4:
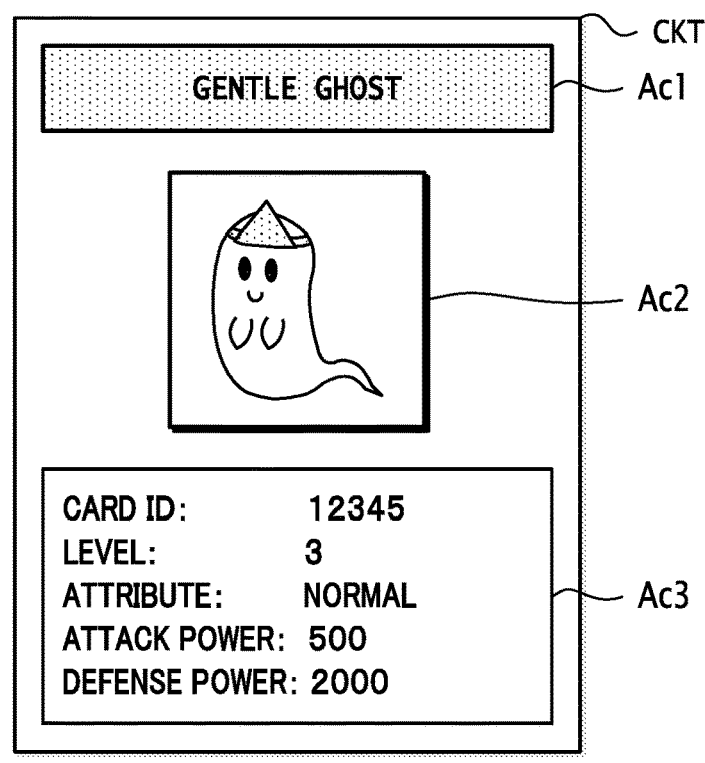
FIG. 4 illustrates an example of a card C.

FIG. 4 illustrates the face of a Monster Card Cx displayed in a game image G-m. In FIG. 4, a Normal Monster Card CKT is given of an example of a Monster Card Cx. Description of FIG. 4 is applied to other Monster Cards Cx than Linked Monster Cards CEL.

As shown in FIG. 4, the face of the Monster Card Cx includes (i) a card name display area Ac1 for displaying a card name, (ii) a monster display area Ac2 for displaying an appearance of a monster summoned by the Monster Card Cx, and (iii) a characteristics display area Ac3 for displaying the Monster Card Cx and characteristics of the monster summoned thereby.

On the characteristics display area Ac3 are displayed a card ID of the Monster Card Cx, a level, an attribute, attack power and defense power of the monster corresponding to the Monster Card Cx. In other words, when the Monster Card Cx is placed face-up while the users U-m1 and U-m2 play against each other, both of them can know the content of the Monster Card Cx.

The attribute of the Monster Card Cx shows that the Monster Card Cx belongs to one of the following: a Normal Monster Card CKT, an Effect Monster Card CKK, a Ritual Monster Card CKG, a Pendulum Monster Card CKP, a Fusion Monster Card CEY, a Synchro Monster Card CES, an Exes Monster Card CEE, a Link Monster Card CEL, a Fusion Pendulum Monster Card CFY, a Synchro Pendulum Monster Card CFS and an Exes Pendulum Monster Card CFE. The card ID is information to uniquely identify each type of the card C from among all types of cards C in the card game.

In this embodiment, an example will be assumed in which a Monster Card Cx with one attribute includes various types of the Monster Cards Cx. In other words, in this embodiment, for example, even when the attributes of two Monster Cards Cx are identical, their card IDs will be different. In this embodiment, the name of each card C is given depending on the type of the card C.

Although detailed description is omitted, the face of a Magic Card Cy shows its content, such as type and effects of the Magic Card Cy. The face of the Trap Card Cz shows its content, such as a type and effects of the Trap Card Cz. Link Monster Cards CEL will be described below.

Figure 5:
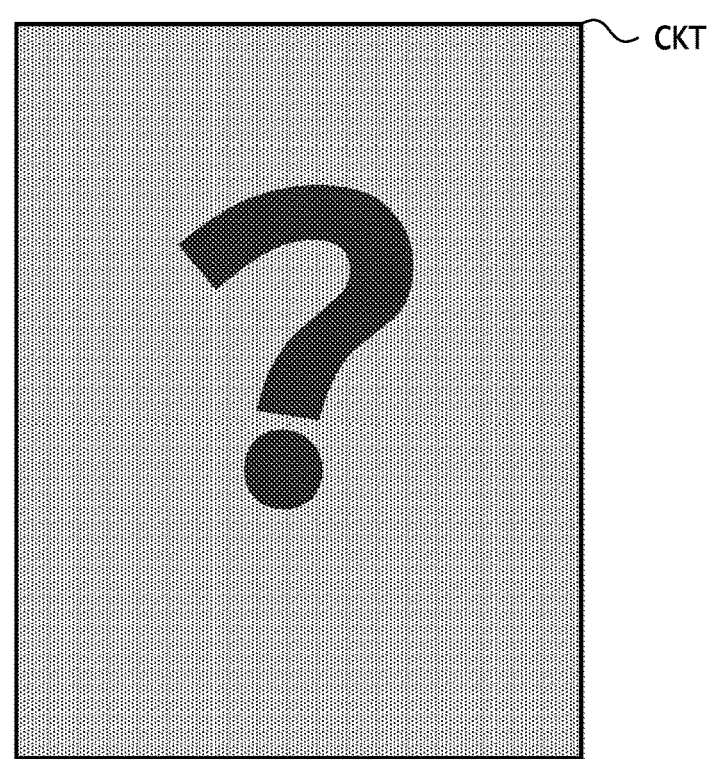
FIG. 5 illustrates an example of the card C.

FIG. 5 illustrates the back of a card C displayed in a game image G-m. In FIG. 5, an example is given of a Normal Monster Card CKT. Description of FIG. 5 is applied to all of the cards C in the card game.

As shown in FIG. 5, the back of the card C shows a predetermined pattern. For this reason, while the users U-m1 and U-m2 play against each other, when the card C is placed face-down, neither of them can know what type of card C is.

Cards C-q included in the Main Deck DM-q constructed by the user U-q are placed face-down on the Main Deck Zone Zmd[q] at the beginning of a battle with two user's cards; cards C-1 included in the deck D-m1 constructed by the user U-m1; and cards C-2 included in the deck D-m2 constructed by the user U-m2. Hereinafter, the cards C-q placed face-down on the Main Deck Zone Zmd[q] are referred to as "main cards."

Cards C-q included in the Extra Deck DE-q constructed by the user U-q are placed face-down on the Extra Deck Zone Zed[q] at the beginning of a battle with two user's cards; cards C-1 included in the deck D-m1 constructed by the user U-m1; and cards C-2 included in the deck D-m2 constructed by the user U-m2. Hereinafter, cards C-q placed face-down on the Extra Deck Zone Zed[q] are referred to as "extra cards."

In this embodiment, an example will be given in which at the beginning of a battle with cards C-1 and C2, the cards C-q included in the Extra Deck DE-q are placed face-down on the Extra Deck Zone Zed[q]. However, the present disclosure is not limited to such an aspect. At the beginning of a battle with cards C-1 and C-2, the cards C-q included in the Extra Deck DE-q may be placed half face-up on the Extra Deck Zone Zed[q]. Although an example will be given in which extra cards are placed face-down on the Extra Deck Zone Zed[q], the extra cards may be cards C-q that are placed half face-up on the Extra Deck Zone Zed[q].

At each turn of the user U-q, at least one card C-q, which has been selected from the main cards at random or according to a predetermined rule, is placed half face-up on a Hand Card Zone Zt[q]. The "hand cards" are thus cards C-q placed half face-up on the Hand Card Zones Zt[q].

It is noted that the user U-m1 can see the face of each hand card of the user U-m1's own, but cannot see the face of each hand card of the user U-m2. Similarly, the user U-m2 can see the face of each hand card of the user U-m2's own, but cannot see the face of each hand card of the user U-m.

In this embodiment, when the user U-m2 is unable to add any cards to the Hand Card Zones Zt[m2] from the user U-m2's main hand cards because the user U-m2 no longer has remaining cards C-2 included in the main cards (the number of cards C-2 reaches "0"), it is determined that the user U-m1 has defeated the user U-m2. Similarly, when the user U-m1 is unable to add any cards to the Hand Card Zones Zt[m1] from the user U-m1's main hand cards because the user U-m1 no longer has remaining cards C-1 (the number of cards C-1 reaches "0"), it is determined that the user U-m2 has defeated the user U-m1.

Alternatively, when the user U-m2 is unable to add any cards to the Hand Card Zones Zt[m2] from the user U-m2's main hand cards because the number of hand cards in the Hand Card Zones Zt[m2] reaches "0," it may be determined that the user U-m1 has defeated the user U-m2. Similarly, when the user U-m1 is unable to add any cards to the Hand Card Zones Zt[m1] from the user U-m1's main hand cards because the number of hand cards in the Hand Card Zones Zt[m1] reaches "0," it may be determined that the user U-m2 has defeated the user U-m1.

3. Overview of Monster Cards

Description will be given of an overview of Monster Cards Cx in the card game according to this embodiment with reference to FIGS. 6 to 9.

3.1. Overview of Standard Monster Cards

First, an overview of Standard Monster Cards CKH will be described.

The "Standard Monster Card CKH" is a collective term for Normal Monster Cards CKT, Effect Monster Cards CKK and Ritual Monster Cards CKG. The Normal Monster Cards CKT are Monster Cards Cx that are used to summon Normal Monsters. The Effect Monster Cards CKK are Monster cards Cx that are used to summon Effect Monsters. The Ritual Monster Cards CKG are Monster Cards Cx that are used to summon Ritual Monsters. Hereafter, Normal Monsters, Effect Monsters and Ritual Monsters are collectively referred to as "Standard Monsters."

In the card game according to this embodiment, Standard Monster Cards CKH are set as main cards, and they are placed on the Main Deck Zone Zmd[q] at the beginning of play of the users U-m1 and U-m2. When a Standard Monster Card CKH is then placed half face-up on a Hand Card Zone Zt[q], the user U-q can place the Standard Monster Card CKH, which is placed half face-up on the Hand Card Zone Zt[q], on a Main Monster Zone Zm[q] to summon a Standard Monster.

Hereinafter, the act of placing a Monster Card Cx, which is placed half face-up on a Hand Card Zone Zt[q], on the Main Monster Zone Zm[q] to summon a monster corresponding to the Monster Card Cx is referred to as "Normal Summon (Normal Summoning a monster)." In this embodiment, the act of summoning a monster by a way other than Normal Summon is referred to as "Special Summon (Special Summoning a monster)."

In the card game according to this embodiment, the way of a formal summons is defined for each attribute of a Monster Card Cx. In this embodiment, the formal summons of Standard Monster Cards CKH is a Normal Summon.

In the card game according to this embodiment, when a Standard Monster Card CKH is destroyed (an example of "first effect"), the Standard Monster Card CKH is placed face-up on the Graveyard Zone Zb[q].

The card game according to this embodiment has a card C with a forced transfer power. The forced transfer power of the card C is a power to force a Monster Card Cx placed on a Main Monster Zone Zm[q] or an Extra Monster Zone Ze to be moved to an area other than these zones. In the card game according to this embodiment, when a Standard Monster Card CKH is forced to be moved by the forced transfer power of another card C (an example of "second effect"), the Standard Monster Card CKH is placed half face-up on a Hand Card Zone Zt[q].

The card game according to this embodiment has a card C with a resurrection power. The resurrection power of the card C is as follows: There is a case in which, after a Monster Card Cx is placed on the field Fd in response to a formal summons, the Monster Card Cx is destroyed and then is placed on the Graveyard Zone Zb[q] or other similar zone. In this case, the resurrection power is a power to reposition the Monster Card Cx placed on the Graveyard Zone Zb[q] to a Main Monster Zone Zm[q], and Special Summon a monster corresponding to the Monster Card Cx by a way other than the formal summons. In other words, in the card game according to this embodiment, when the Standard Monster Card CKH is resurrected by the resurrection power of another card C, the Standard Monster Card CKH is placed face-up on the Main Monster Zone Zm[q].

In the card game according to this embodiment, when a Monster Card Cx is destroyed and is placed on the Graveyard Zone Zb[q] after the Monster Card Cx is placed on the field Fd by a way other than the formal summons, the Monster Card Cx is never resurrected from the Graveyard Zone Zb[q].

3.2. Overview of Specific Monster Cards

Next, an overview of Specific Monster Cards CET will be described.

As described above, Specific Monster Cards CET are a collective term for Fusion Monster Cards CEY, Synchro Monster Cards CES, and Exes Monster Cards CEE.

The Fusion Monster Cards CEY are Monster Cards Cx that are used to Special Summon a Fusion Monster. Hereinafter, the act of Special Summoning a Fusion Monster is referred to as "Fusion Summon (e.g., a monster is Fusion Summoned)." In this embodiment, the formal summons of Fusion Monster Cards CEY is a Fusion Summon.

When a fusion monster corresponding to a Fusion Monster Card CEY is Fusion Summoned by the user U-q, the user U-q may be required to place a Fusion Magic Card from among the Magic Cards Cy to a Magic Trap Zone Zw[q] to enable the Fusion Magic Card to be active. In addition, the user U-q may be required to move, to the Graveyard Zone Zb[q], another card C-q that is different from the Fusion Monster Card CEY of the Fusion Monster to be Fusion Summoned.

The Synchro Monster Cards CES are Monster Cards Cx that are used to Special Summon a Synchro Monster. Hereinafter, the act of Special Summoning Synchro Monsters is referred to as "Synchro Summon (e.g., a monster is Synchro Summoned)." In this embodiment, the formal summons of Synchro Monster Cards CES is a Synchro Summon. When a Synchro Monster corresponding to a Synchro Monster Card CES is Synchro Summoned by the user U-q, the user U-q may be required to move, to the Graveyard Zone Zb[q], another card C-q that is different from Fusion Monster Card CEY corresponding to the Fusion Monster to be Fusion Summoned.

The Exes Monster Cards CEE are Monster Cards Cx that are used to Special Summon an Exes Monster. Hereinafter, the act of Special Summoning an Exes Monster is referred to as "Exes Summon (e.g., a monster is Exes Summoned). In this embodiment, the formal summons of Exes Monster Cards CEE is an Exes Summon. When an Exes Monster corresponding to an Exes Monster Card is Exes Summoned by the user U-q, the user U-q may be required to put, under an Exes Monster Card CEE in the field Fd, another card C-q that is different from the Exes Monster Card CEE corresponding to the Exes Monster to be summoned.

Hereinafter, Fusion Monsters, Synchro Monsters and Exes Monsters are referred to as "specific monsters." However, the specific monsters cannot be Normal Summoned in this embodiment.

In the card game according to this embodiment, Specific Monster Cards CET are set as extra cards, and they are placed face-down on the Extra Deck Zone Zed[q] at the beginning of play of the users U-m1 and U-m2. Alternatively, the Specific Monster Cards CET may be placed half face-up, as extra cards, on the Extra Deck Zone Zed[q] at the beginning of the play. The user U-q can then select any of the Main Monster Zones Zm[q] and the Extra Monster Zones Ze. The user U-q can place, on the selected zone, a Specific Monster Card CET that is placed face-down, to Special Summon a specific monster.

In the card game according to this embodiment, a Specific Monster Card CET is placed face-up on the Graveyard Zone Zb[q], when the Specific Monster Card CET is destroyed.

In the card game according to this embodiment, when a Specific Monster Card CET is forced to be moved by the forced transfer power of another card C, the Specific Monster Card CET is set as an extra card, and it is placed face-down on the Extra Deck Zone Zed[q].

In the card game according to this embodiment, a Specific Monster Card CET is placed face-up on a Main Monster Zone Zm[q], when the Specific Monster Card CET is resurrected by the resurrection power of another card C.

In the card game according to this embodiment, the card game has a card C with a reposition power. The reposition power of a card C is as follows: There is a case in which, after a Specific Monster Card CET is placed on the field Fd in response to a formal summons, the Specific Monster Card CET is forced to be moved to the Extra Deck Zone Zed[q] by a card C with the forced transfer power, and as a result it is placed face-down as an extra card. In this case, the reposition power is a power to reposition the faced-down Specific Monster Card CET to the selected zone by the user U-q from the Main Monster Zones Zm[q] and the Extra Monster Zones Ze, to Special Summon a specific monster corresponding to the Specific Monster Card CET by a way other than the formal summons. In other words, the card game according to this embodiment, when the Specific Monster Card CET is repositioned by the reposition power of another card C, the Specific Monster Card CET is placed face-up on the zone selected by the user U-q from among the Main Monster Zones Zm[q] and the Extra Monster Zones Ze.

In the card game according to this embodiment, there is a case in which a Specific Monster Card CET is set as an extra card, and it is placed face-down on the Extra Deck Zone Zed[q] by a card C with the forced transfer power after the Specific Monster Card CET is placed on the Field Fd by a way other than a formal summons. In this case, the Specific Monster Card CET cannot be repositioned on any of the Main Monster Zones Zm[q] and the Extra Monster Zones Ze.

3.3. Overview of Link Monster Cards

Next, an overview of Link Monster Cards CEL will be described.

Figure 6:
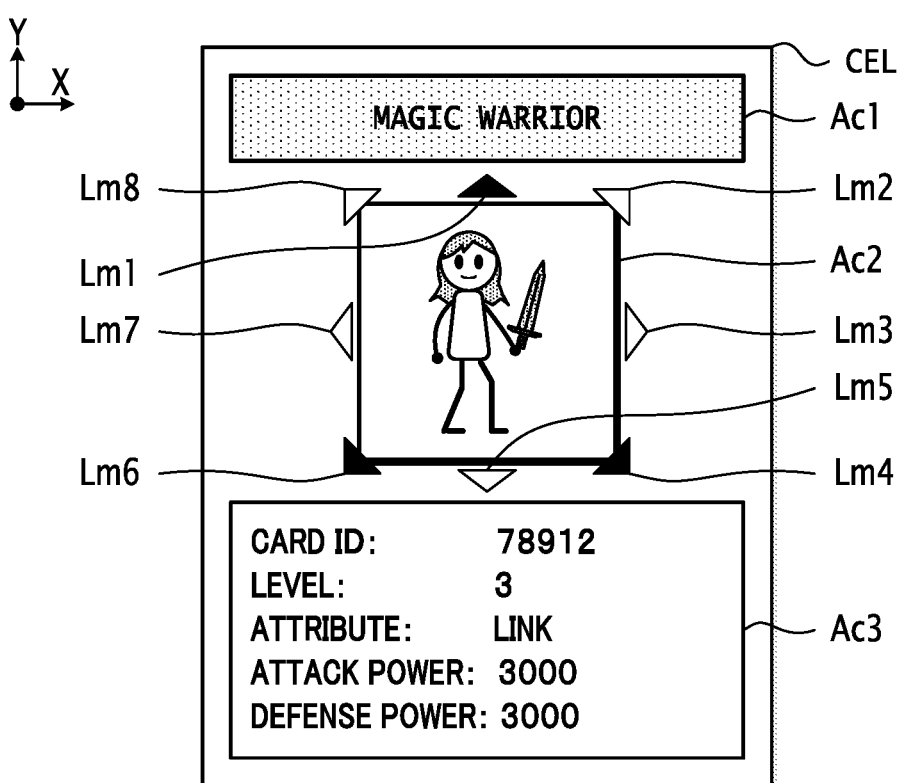
FIG. 6 illustrates an example of a Link Monster Card CEL.

FIG. 6 illustrates the face of a Link Monster Card CEL displayed in a game image G-m.

As shown in FIG. 6, the Link Monster Card CEL is similar to a Monster Card Cx other than the Link Monster Cards CEL (e.g., Normal Monster Cards CKT). However, the Link Monster Card CEL differs in that link markers Lm1-Lm8 are shown on the Link Monster Card CEL. The link markers Lm1-Lm8 are as follows:

(i) The link marker Lm1 shows the +Y direction (up) in the game image G-q.

(ii) The link marker Lm2 shows the direction between the +X and +Y directions (upper right) in the game image G-q.

(iii) The link marker Lm3 shows the +X direction (right) in the game image G-q.

(iv) The link marker Ln4 shows the direction between the +X and −Y directions (lower right) in the game image G-q.

(v) The link marker Lm5 shows the −Y direction (down) in the game image G-q.

(vi) The link marker Lm6 shows the direction between the −X and −Y directions (lower left) in the game image G-q.

(vii) The link marker Lm7 shows the −X direction (left) in the game image G-q.

(viii) The link marker Lm8 shows the direction between the −X and +Y directions (upper left) in the game image G-q.

In this embodiment, among the link markers Lm1-Lm8 of the Link Monster Card CEL, some link markers Lm are active, the number of which depends on the level of the Link Monster Card CEL. In FIG. 6, link markers Lm1, Lm4 and Lm6 in black show that they are active.

When there is a Main Monster Zone Zm[q] or an Extra Monster Zone Ze which is positioned in the direction indicated by an active link marker Lm, the zone is referred to as "Link Zone ZL."

Figure 7:
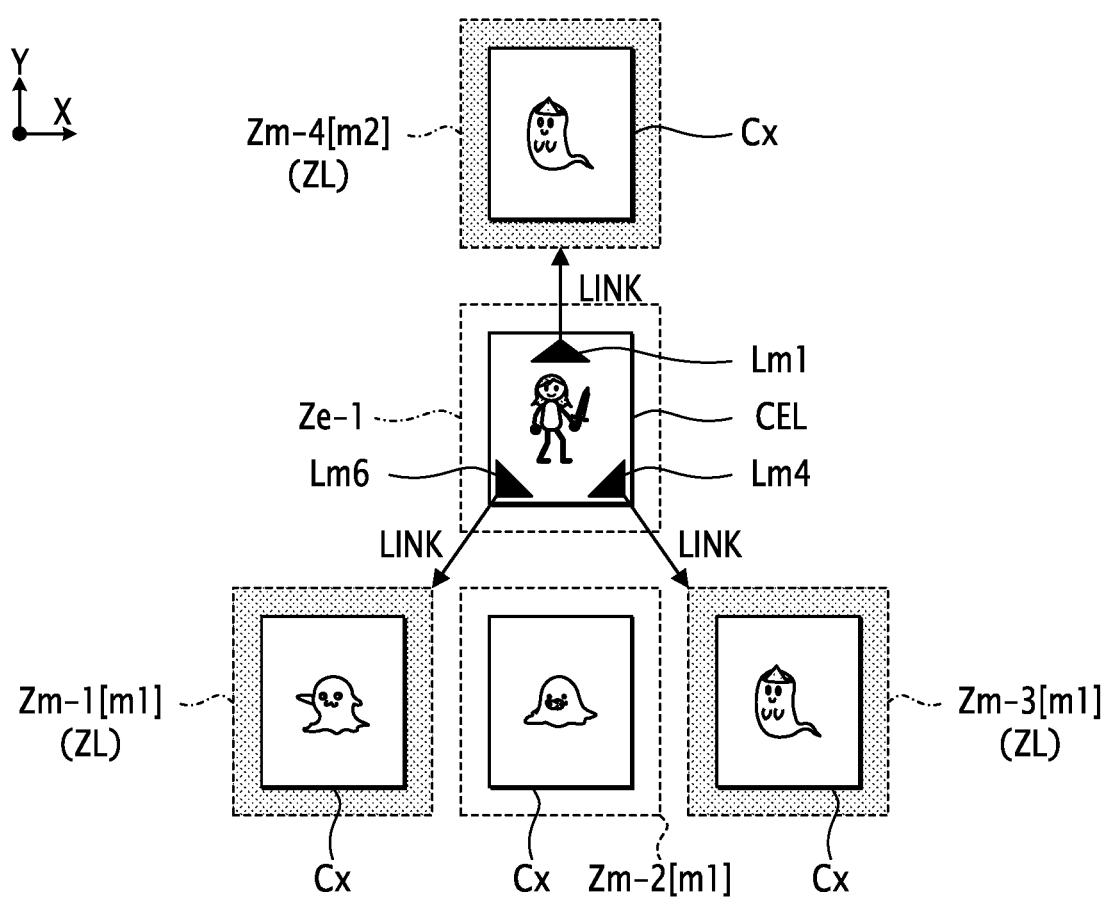
FIG. 7 illustrates an example of a Link Monster Card CEL.

As shown in FIG. 7, an example case will be given in which a Link Monster Card CEL with active link markers Lm1, Lm4 and Lm6 is placed by the user U-m1. In this case, the following Main Monster Zones have properties of the Link Zone ZL:

(i) a Main Monster Zone Zm-3[m1] that is on the lower right of the game image G-q and is indicated by the link marker Lm4 of the Link Monster Card CEL placed on the Extra Monster Zone Ze-1;

(ii) a Main Monster Zone Zm-1[m1] that is on the lower left of the game image G-q and is indicated by the link marker Lm6 of the Link Monster Card CEL placed on the Extra Monster Zone Ze-1; and (iii) a Main Monster Zone Zm-4[m2] that is upper of the game image G-q and is indicated by the link marker Lm1 of the Link Monster Card CEL placed on the Extra Monster Zone Ze-1.

In other words, the Link Monster Card CEL of the user U-m1 has an effect on not only the user field Fu[m1] but also the user field Fu[m2].

Figure 8:
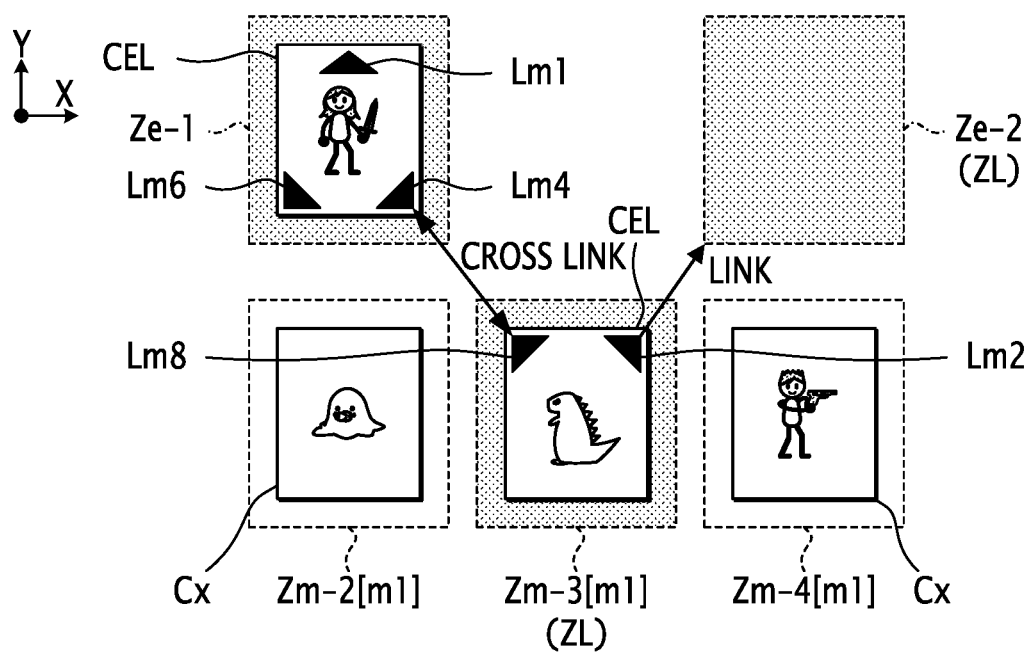
FIG. 8 illustrates an example of a cross link.

In an example of FIG. 8, two Link Monster Cards CEL are shown, one of which is referred to as a first Link Monster Card CEL, and the other of which is referred to as a second Link Monster Card CEL. The first Link Monster Card CEL has an active link marker Lm, and the second Link Monster Card CEL is placed on a Link Zone ZL that is indicated by this active link marker Lm. In addition, the second Link Monster Card CEL has an active link marker Lm, and the first Link Monster Card CEL is placed on a Link Zone ZL that is indicated by this active link marker Lm. The relationship between the two Link Monster Cards CEL is referred to as "cross link."

Figure 9:
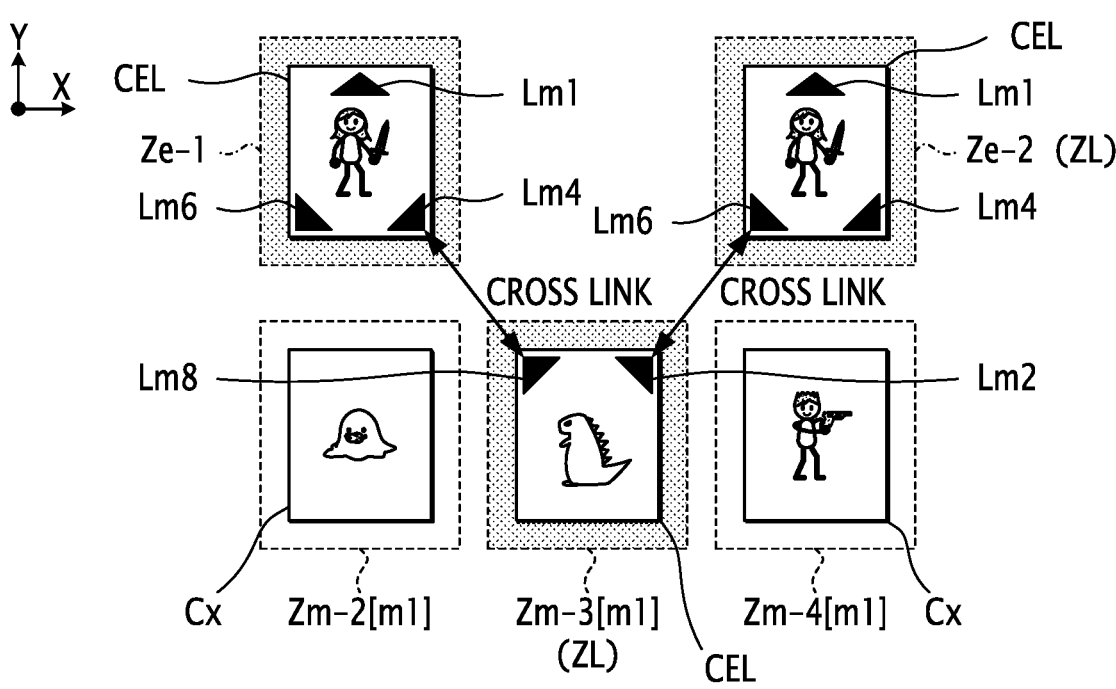
FIG. 9 illustrates an example of an extra link.

As shown in FIG. 9, two Link Monster Cards CEL are connected by cross links, one of which is a Link Monster Card CEL that is placed on the Extra Monster Zone Ze-1, and the other of which is a Link Monster Card CEL that is placed on the Extra Monster Zone Ze-2. This status is referred to as "extra link." As described above, only when an extra link is formed, the user U-q can place Link Monster Cards CEL of the user U-q on both of the two Extra Monster Zones Ze.

The Link Monster Cards CEL are Monster Cards Cx that are used to Special Summon a Link Monster. Hereinafter, the act of Special Summoning a Link Monsters is referred to as "Link Summon (a monster is Link Summoned)." In this embodiment, the Normal Summon of Link Monster Cards CEL is a Link Summon. However, Link Monsters cannot be Normal Summoned in this embodiment. When a Link Monster corresponding to a Link Monster Card CEL is Link Summoned by the user U-q, the user U-q may be required to move, to the Graveyard Zone Zb[q], a card C-q that differs from the Link Monster Card CEL corresponding to the Link Monster to be Link Summoned.

In the card game according to this embodiment, Link Monster Cards CEL are set as extra cards, and they are placed face-down on the Extra Deck Zone Zed[q] at the beginning of play of the users U-m1 and U-m2. The Link Monster Cards CEL may be set as extra cards and may be placed half face-up on the Extra Deck Zone Zed[q] at the beginning of the play. The user U-q can then select any one from among the Extra Monster Zones Ze, and the Main Monster Zones Zm[q] with properties of a Link Zone ZL, and the user U-q can place, on the selected zone, a Link Monster Card CEL that is placed face-down on the Extra Deck Zone Zed[q] to Special Summon a Link Monster.

In the card game according to this embodiment, a Link Monster Card CEL is placed on face-up on the Graveyard Zone Zb[q], when the Link Monster Card CEL is destroyed.

In the card game according to this embodiment, when a Link Monster Card CEL is forced to be moved by the forced transfer power of another card C, the Link Monster Card CEL is set as an extra card and is placed face-down on the Extra Deck Zone Zed[q].

In the card game according to this embodiment, a Link Monster Card CEL is placed face-up on a Main Monster Zone Zm[q], when the Link Monster Card CEL is resurrected by the resurrection power of another card C.

In the card game according to this embodiment, there is a case in which a Link Monster Card CEL is set as an extra card, and it is placed face-down on the Extra Deck Zone Zed[q] by forced transfer power after the Link Monster Card CEL is placed on the Field Fd in response to a formal summons. In this case, when the user U-q selects any one from among the Extra Monster Zones Ze, and the Main Monsters Zones Zm[q] with properties of a Link Zone ZL, the Link Monster Card CEL that is placed face-down on the Extra Deck Zone Zed[q] is repositioned on the selected zone by a card C with the reposition power. This allows for the card C to Special Summon a Link Monster corresponding to the Link Monster Card CEL by a way other than the formal summons.

In other words, in the card game according to this embodiment, when the Link Monster Card CEL is repositioned by the reposition power of another card C, the Link Monster Card CEL is placed face-up on the zone selected by the user U-q from among the Extra Monster Zones Ze, and the Main Monsters Zones Zm[q] with properties of a Link Zone ZL.

In the card game according to this embodiment, there is a case in which, after a Link Monster Card CEL is placed on the Field Fd by a way other than a formal summons, the Link Monster Card CEL is set as an extra card, and it is placed face-down on the Extra Deck Zone Zed[q] by a card C with the forced transfer power. In this case, the Link Monster Card CEL cannot be repositioned on any of the Extra Monster Zones Ze, and the Main Monsters Zones Zm[q] with properties of a Link Zone ZL.

3.4. Overview of Pendulum Monster Cards

Next, an overview of Pendulum Monster Cards CKP will be described.

In this embodiment, the Pendulum Monster Cards CKP are Monster Card Cx that are used to Normal Summon a Pendulum Monster. In other words, in the card game according to this embodiment, Pendulum Monster Cards CKP are set as extra cards, and they are placed face-down on the Main Deck Zone Zmd[q] at the beginning of play of the users U-m1 and U-m2. Thereafter, when a Pendulum Monster Card CKP is placed half face-up on a Hand Card Zone Zt[q], the user U-q can place the Pendulum Monster Card CKP, which is placed half face-up on the Hand Card Zone Zt[q], on a Main Monster Zone Zm[q] to summon a Pendulum Monster. The formal summons of Pendulum Monster Cards CKP is a Normal Summon.

When a Pendulum Monster Card CKP is placed half face-up on a Hand Card Zone Zt[q], the user U-q can place, on a Pendulum Zone Zp[q], the Pendulum Monster Card CKP placed on half face-up on the Hand Card Zone Zt[q]. Thereafter, when the user U-m1 places a Pendulum Monster Card CKP on a Pendulum Zone Zp-1[q] and place another Pendulum Monster Card CKP on a Pendulum Zone Zp-2[q], a Pendulum Summon can be performed based on the two Pendulum Monster Cards CKP. The Pendulum Summon is a Special Summon to summon a monster corresponding to at least one Monster Card Cx placed on a Main Monster Zone Zm[q]. This Special Summon is performed by placing, on Main Monster Zones Zm[q], Monster Cards Cx, the number of which are desired by the user U-q up to the number of the Main Monster Zones Zm[q]. This placement is performed based on the two Pendulum Monster Cards CKP that are placed on the two Pendulum Zones Zp[q]. In this embodiment, the user U-q can place at least one Monster Card Cx on a Main Monster Zone Zm[q] when a Pendulum Summon. At least one Monster Card Cx that can be placed on the Main Monster Zone Zm[q] has a level ranging between two kinds of levels of two Pendulum Monster Cards CKP. One of the two is a Pendulum Monster Card CKP (referred to as "first Pendulum Monster Card CKP") that is placed on the Pendulum Zone Zp-1[q] and has a first level. The other one is a second Pendulum Monster Card CKP (referred to as "second Pendulum Monster Card CKP") that is placed on the Pendulum Zone Zp-2[q] and has a second level. More specifically, when a Pendulum Summon, when the first level of the first Pendulum Monster Card CKP is higher than the second level of the second Pendulum Monster Card CKP, the user U-q can place, on the Main Monster Zone Zm[q], at least one Monster Cards Cx with a level satisfying the following conditions (i) and (ii): (i) the level is higher than the second level of the second Pendulum Monster Card CKP; and (ii) the level is lower than the first level of the first Pendulum Monster Card CKP.

In this embodiment, an example case is given in which Monster Cards Cx, the number of which is desired by the user U-q up to the number of the Main Monster Zones Zm[q], can be placed on Main Monster Zones Zm[q] by performing a Pendulum Summon. However, the present disclosure is not limited to such an aspect. For example, by performing a Pendulum Summon, the user U-q can place, on Main Monster Zones Zm[q] or Extra Monster Zones Ze, Monster Cards Cx, the number of which is desired by the user U-q up to the sum of the numbers of the Main Monster Zones Zm[q] and the Extra Monster Zones Ze.

In the card game according to this embodiment, when a Pendulum Monster Card CKP is destroyed, it is placed face-up on the Extra Deck Zone Zed[q].

In the card game according to this embodiment, when a Pendulum Monster Card CKP is forced to be moved by the forced transfer power of another card C, the Pendulum Monster Card CKP is placed half face-up on a Hand Card Zone Zt[q].

In the card game according to this embodiment, there is a case in which a Pendulum Monster Card CKP is destroyed and is placed face-up on the Extra Deck Zone Zed[q] after the Pendulum Monster Card CKP is placed on the field Fd in response to a formal summons. In this case, when the user U-q selects any one from among the Extra Monster Zones Ze, and the Main Monster Zones Zm[q] with the properties of a Link Zone ZL, the Pendulum Monster Card CKP that is placed face-up on the Extra Deck Zone Zed[q] is repositioned on the selected zone by a card C with the resurrection power. This allows for the card C to Special Summon a monster corresponding to the Pendulum Monster Card CKP by a way other than the formal summons. In other words, in the card game according to this embodiment, when the Pendulum Monster Card CKP is resurrected by the resurrection power of another card C, the Pendulum Monster Card CKP is placed face-up on the zone selected by the user U-q from among the Extra Monster Zones Ze, and the Main Monster Zones Zm[q] with the properties of a Link Zone ZL.

3.5. Overview of Composite Monster Cards

An overview of Composite Monster Cards CF will be described.

As described above, the Composite Monster Cards CF are a collective term of Fusion Pendulum Monster Cards CFY, Synchro Pendulum Monster Cards CFS and Exes Pendulum Monster Cards CFE.

The Fusion Pendulum Monster Cards CFY are Monster Cards Cx that are used to Fusion Summon a Fusion Pendulum Monster. In this embodiment, the formal summons of Fusion Pendulum Monster Cards CFY is a Fusion Summon.

The Synchro Pendulum Monster Cards CFS are Monster Cards Cx that are used to Synchro Summon a Synchro Pendulum Monster. In this embodiment the formal summons of Synchro Pendulum Monster Cards CFS is a Synchro Summon.

The Exes Pendulum Monster Cards CFE are Monster Cards Cx that are used to summon an Exes Pendulum Monster. In this embodiment, the formal summons of the Exes Pendulum Monster Cards CFE is an Exes Summon.

Hereinafter, Fusion Pendulum Monsters, Synchro Pendulum Monsters and Exes Pendulum Monsters are referred to as "composite monsters." In this embodiment, the composite monsters cannot be Normal Summoned.

In the card game according to this embodiment, Composite Monster Cards CF are set as extra cards, and they are placed face-down on the Extra Deck Zone Zed[q] at the beginning of play of the users U-m1 and U-m2. The Composite Monster Cards CF may be set as extra cards, and they may be placed half face-up on the Extra Deck Zone Zed[q] at beginning of the play. The user U-q can then select any one from among the Extra Monster Zones Ze and the Main Monster Zones Zm[q], and the user U-q can place, on the selected zone, a Composite Monster Card CF that is set as an extra card and is placed face-down on the Extra Deck Zone Zed[q] to Special Summon a Composite Monster.

In the card game according to this embodiment, a Composite Monster Card CF is placed face-up on the Extra Deck Zone Zed[q], when the Composite Monster Card CF is destroyed.

In the card game according to this embodiment, when a Composite Monster Card CF is forced to be moved by the forced transfer power of another card C, the Composite Monster Card CF is set as an extra card, and it is placed face-down on the Extra Deck Zone Zed[q].

In the card game according to this embodiment, there is a case in which a Composite Monster Card CF is destroyed and is placed face-up on the Extra Deck Zone Zed[q] after the Composite Monster Card CF is placed on the field Fd in response to a formal summons. In this case, when the user U-q selects any one from among the Extra Monster Zones Ze, and the Main Monsters Zones Zm[q] with properties of a Link Zone ZL, the Composite Monster Card CF that is placed on the Extra Deck Zone Zed[q] is placed face-up on the selected zone by a card C with the resurrection power. This allows for the card C to Special Summon a monster corresponding to the Composite Monster Card CF by a way other than the formal summons. In other words, in the card game according to this embodiment, when a Composite Monster Card CF is resurrected by the resurrection power of another card C, the Composite Monster Card CF is placed face-up on the zone selected by the user U-q from among the Extra Monster Zones Ze, and the Main Monster Zones Zm[q] with the properties of a Link Zone ZL.

In the card game according to this embodiment, there is a case in which a Composite Monster Card CF is set as an extra card, and it is placed face-down on the Extra Deck Zone Zed[q] by forced transfer power after the Composite Monster Card CF is placed on the Field Fd in response to a formal summons. In this case, when the user U-q selects any one from among the Main Monsters Zones Zm[q] and the Extra Monster Zones Ze, the Composite Monster Card CF that is placed face-down on the Extra Deck Zone Zed[q] is repositioned on the selected zone by a card C with the reposition power. This allows for the card C to Special Summon a Composite Monster corresponding to the Composite Monster Card CF by a way other than the formal summons. In other words, in the card game according to this embodiment, when a Composite Monster Card CF is repositioned by the reposition power of another card C, the Composite Monster Card CF is placed face-up on the zone selected by the user U-q from among the Main Monsters Zones Zm[q] and the Extra Monster Zones Ze.

In the card game according to this embodiment, there is a case in which, after a Composite Monster Card CF is placed on the Field Fd by a way other than a formal summons, the Composite Monster Card CF is set as an extra card, and it is placed face-down on the Extra Deck Zone Zed[q] by a card C with the forced transfer power. In this case, the Composite Monster Card CF cannot be repositioned on any of the Main Monsters Zones Zm[q] and the Extra Monster Zones Ze.

4. Configuration of Game System

A configuration will be described of the server apparatus 30 and the terminal apparatuses 10 in the game system 1 with reference to FIGS. 10 through 13.

FIG. 10 is a functional block diagram showing an example of a configuration of the server apparatus 30.

As shown in FIG. 10, the server apparatus 30 includes a server control section 31 that controls each element of the server apparatus 30, a memory section 32 that stores various information, and a communication section 33 that communicates with external devices such as the terminal apparatus 10.

The server control section 31 includes a game control section 310 and a data acquirer 314. The game control section 310 includes a field manager 311, a card manager 312 and a game progressor 313.

The field manager 311 manages statuses of various zones, which are disposed on the field Fd and the user information display area Ar[q] in the card game executed on the server apparatus 30. The card manager 312 manages statuses of various cards C in the card game executed on the server apparatus 30. The game progressor 313 controls the progress of the card game executed on the server apparatus 30. The data acquirer 314 acquires various information transmitted from a terminal apparatus 10, such as user inputs to the terminal apparatus 10 by its user U.

The memory section 32 stores: a card information table TBL1 relating to cards C included in the card game; a user information table TBL2 relating to the user U of each terminal apparatus 10; user-owned card information table TBL3 relating to cards C owned by the user U; main deck information table TBL4 relating to cards C included in the Main Deck DM constructed by the user U; extra deck information table TBL5 relating to cards C included in the Extra Deck DE constructed by the user U; zone information table TBL6 relating to zones disposed on the field Fd of the card game; game status table TBL7 relating to a status of how the card game progresses; card status information TBL8 relating to a status of each card C of the card game; and a control program PRGs of the server apparatus 30 (an example of "program"). The data structure of each table will be described below.

FIG. 11 illustrates an example of a hardware configuration of the server apparatus 30.

As shown in FIG. 11, the server apparatus 30 includes a processor 3001 that controls each element thereof, a memory 3002 that stores various information and a communication device 3003 that communicates with external devices external to the server apparatus 30. The memory 3002 is, for example, a computer-readable recording medium. The memory 3002 is a non-transitory storage medium and acts as the memory section 32. Examples of the memory 3002 include one or both of the following: a volatile memory, such as a Random Access Memory (RAM), which serves as a work area for the processor 3001; and a nonvolatile memory, such as an Electrically Erasable Programmable Read-Only Memory (EEPROM), that stores various information such as a control program PRGs of the server apparatus 30. In this embodiment, an example will be given of the memory 3002 which is the "recording medium" in which the control program PRGs is recorded, but the present disclosure is not limited to such an aspect. The "recording medium" in which the control program PRGs is recorded may be a memory provided in an external device external to the server apparatus 30. The "recording medium" in which the control program PRGs is recorded may be a memory provided in a distribution server that is external to the server apparatus 30 and distributes the control program PRGs. The processor 3001 comprises one or more CPUs (Central Processing Unit). The processor 3001 executes the control program PRGs stored in the memory 3002 and is operated in accordance with the control program PRGs to act as the server control section 31.

The processor 3001 may include other hardware, such as a Graphics Processing Unit (GPU), a Digital Signal Processor (DSP), or a Field Programmable Gate Array (FPGA) in addition to or instead of the CPU. In this case, some or all of the server control section 31 which is realized by the processor 3001 may be realized by hardware such as a DSP. Furthermore, the processor 3001 may include some or all of one or more CPUs and one or more hardware elements. Specifically, when the processor 3001 includes CPUs, some or all of the functions of the server control section 31 may be realized by some or all of these CPUs operating together in accordance with the control program PRGs.

The communication device 3003 is hardware that communicates with external devices external to the server apparatus 30 via one of or both of wired and wireless networks. The communication device 3003 acts as the communication section 33.

Figure 12:
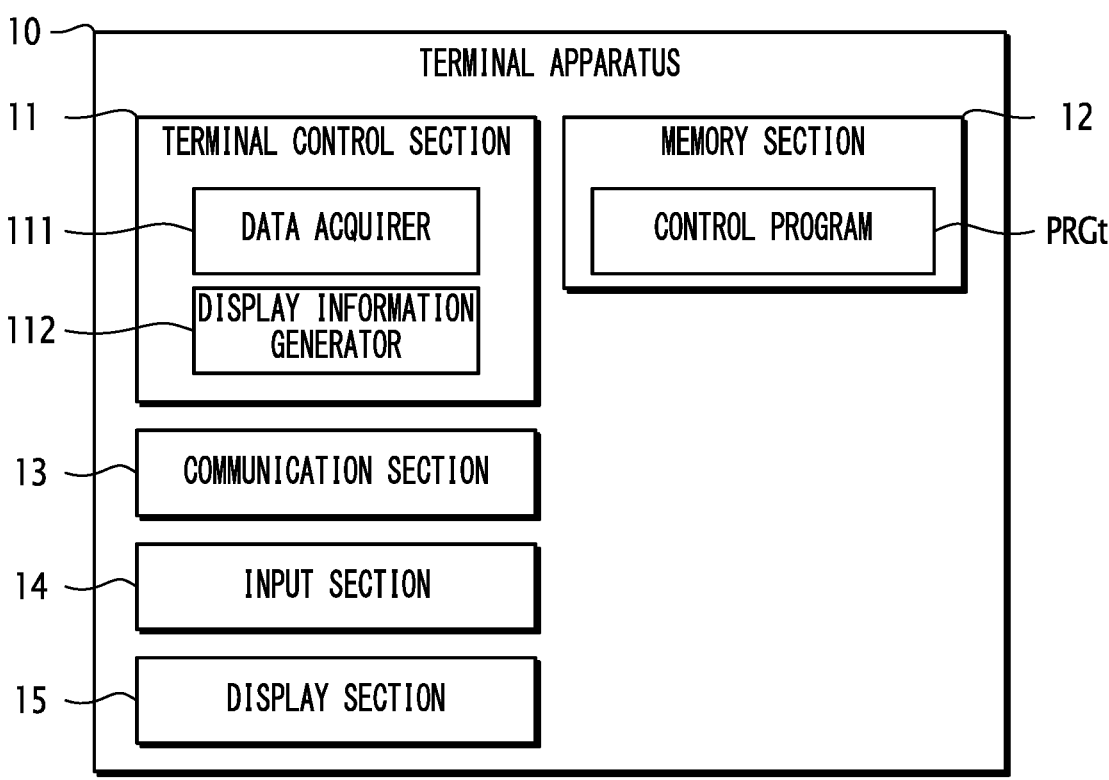
FIG. 12 is a functional block diagram showing an example of a configuration of each terminal apparatus 10.

FIG. 12 is a functional block diagram showing an example of a configuration of each terminal apparatus 10.

As shown in FIG. 12, each terminal apparatus 10 includes a terminal control section 11 that controls each element of the terminal apparatus 10, a memory section 12 that stores various information such as a control program PRGt of the terminal apparatus 10, a communication section 13 that communications with external devices such as a server apparatus 30, an input section 14 that receives user inputs made by the user U of the terminal apparatus 10, and a display section 15 that is used to display various images.

The terminal control section 11 includes a data acquirer 111 and a display information generator 112. The data acquirer 111 acquires various information transmitted from the server apparatus 30. The display information generator 112 controls the display section 15 such that various images such as a game image G are displayed on the display section 15.

Figure 13:
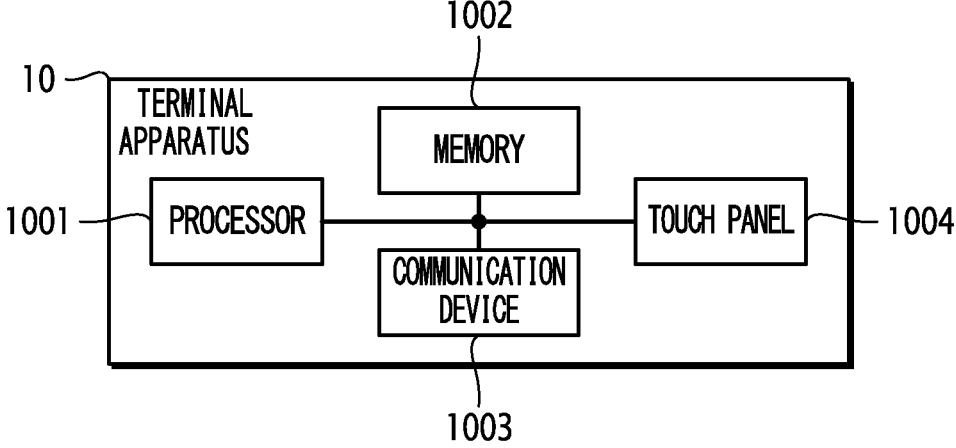
FIG. 13 illustrates an example of a hardware configuration of each terminal apparatus 10.

FIG. 13 illustrates an example of a hardware configuration of each terminal apparatus 10.

As shown in FIG. 13, each terminal apparatus 10 includes a processor 1001 that controls each element of the terminal apparatus 10, a memory 1002 that stores various information, a communication device 1003 that communicates with external devices external to the terminal apparatus 10, and a touch panel 1004 that displays various images and receives user inputs made by the user U of the terminal apparatus 10. The memory 1002 is, for example, a computer-readable recording medium. The memory 1002 is a non-transitory storage medium and acts as the memory section 12. The examples of the memory 1002 include one or both of the following: a volatile memory, such as a RAM, which serves as a work area for the processor 1001; and a nonvolatile memory, such as EEPROM, that stores various information such as a control programs and PRGt for the terminal apparatus 10. The processor 1001 comprises one or more CPUs. The processor 1001 executes the control program PRGt stored in the memory 1002 and is operated in accordance with the control program PRGt to act as the terminal control section 11.

The processor 1001 may include other hardware, such as a GPU, a DSP, or a DSP in addition to, or instead of, the CPU. In this case, some or all of the terminal control section 11 which is realized by the processor 1001 may be realized by hardware such as a DSP.

The communication device 1003 is hardware that communicates with external devices external to the terminal apparatus 10 via one of or both of wired and wireless networks. The communication device 1003 acts as the communication section 13.

The touch panel 1004 acts as the display section 15 that displays various images and acts as the input section 14 that receives user inputs made by the user U of the terminal apparatus 10.

5. Data Stored in the Game System

Various data stored in the game system 1 will be described with reference to FIGS. 14 through 24.

FIG. 14 through 17 show each an example of a data structure of the card information table TBL1.

As shown in FIGS. 14 through 17, the card information table TBL1 includes records that correspond one-to-one to all types of cards that will appear in the card game. Each record in the card information table TBL1 includes a card ID and card information relating to a card C with its card ID.

In the examples shown in FIGS. 14 through 17, a card C with card ID "11111" is an example of a card that is classified as a Standard Monster Card CKH. A card C with card ID "11112" is an example of a card that is classified as a Link Monster Card CEL. A card C with card ID "11113" is an example of a card that is classified as a Specific Monster Card CET. A card C with card ID "11114" is an example of a card that is classified as a Pendulum Monster Card CKP. A card C with card ID "1115" is an example of a card that is classified as a Composite Monster Card CF.

As shown in FIGS. 14 through 17, the card information of each record includes a card name, a card type information, formal summons information, special power information, card placement information, monster card information, magic card information, and trap card information.

The card name is a name of a card C with its card ID.

The card type information includes card classification information, card higher-layer attribute information and card lower-layer attribute information.

The card classification information indicates to which of the following the card C with a card ID corresponds: a Monster Card Cx, a Magic Card Cy, or a Trap Card Cz.

The card higher-layer attribute information is as follows: When the card C with a card ID is a Monster Card Cx, the card higher-layer attribute information indicates to which of the following this Monster Card Cx corresponds: a Basic Monster Card CK, an Extra Monster Card CE or a Composite Monster Card CF. Even when the card C with a card ID corresponds to either the Magic Card Cy or the Trap Card Cz, the card higher-layer attribute information indicates the type thereof, but these descriptions are omitted in this embodiment.

The card lower-layer attribute information is as follows: When the card C with a card ID is a Monster Card Cx, the card lower-layer attribute information indicates to which of the following this Monster Card Cx corresponds: a Normal Monster Card CKT, an Effect Monster Card CKK, a Ritual Monster Card CKG, a Pendulum Monster Card CKP, a Fusion Monster Card CEY, a Synchro Monster Card CES, an Exes Monster Card CEE, a Link Monster Card CEL, a Fusion Pendulum Monster Card CFY, a Synchro Pendulum Monster Card CFS, or an Exes Pendulum Monster Card CFE. Even when is the card C with a card ID corresponds to a Magic Card Cy or a Trap Card Cz, the card lower-layer attribute information indicates the type thereof, but these descriptions are omitted in this embodiment.

For convenience of description, in this embodiment, description will be given of the card type information including the card classification information, the card higher-layer attribute information and the card lower-layer attribute information. However, the card type information only needs to include at least the card lower-layer attribute information.

The formal summons information indicates what the formal summons of a Monster Card Cx is, when the card C with a card ID is a Monster Card Cx. As described above, in this embodiment, the formal summons of a Basic Monster Card CK is a Normal Summon. The formal summons of a Fusion Monster Card CEY is a Fusion Summon. The formal summons of a Synchro Monster Card CES is a Synchro Summon. The formal summons of an Exes Monster Card CEE is an Exes Summon. The formal summons of a Link Monster Card CEL is a Link Summon. The formal summons of a Fusion Pendulum Monster Card CFY is a Fusion Summon. The formal summons of a Synchro Pendulum Monster Card CFS is a Synchro Summon. The formal summons of an Exes Pendulum Monster Card CFE is an Exes Summon.

The special power information indicates whether the card C with a card ID has the forced transfer power, the resurrection power or the reposition power. In FIG. 14, an example case is given in which the Standard Monster Card CKH has the forced transfer power, the Specific Monster Card CET has the reposition power, and the Composite Monster Card CF has the resurrection power. However, this embodiment is not limited to such an aspect. It may be determined whether each card C has the forced transfer power, the resurrection power, or the reposition power independently of the classification or attributes of the card C.

The card placement information includes initial deck placement information, initial field placement information, destruction placement information, forced-transfer placement information, resurrection placement information, face-up reposition information, and face-down reposition information.

The initial deck placement information indicates (i) the type of a zone in which the card C with a card ID is placed, and (ii) a placement mode, at the beginning of play of the users U-m1 and U-m2. As described above, in this embodiment, when the card C with a card ID is any one of a Basic Monster Card CK, a Magic Card Cy and a Trap Card Cz, the card C is set as a main card, and it is placed face-down on the Main Deck Zone Zmd[q]. Alternatively, when the card C with a card ID is an Extra Monster Card CE or a Composite Monster Card CF, the card C is set as an extra card, and it is placed face-down on the Extra Deck Zone Zed[q].

The initial field placement information indicates types of zones in which the card C with a card ID can be placed first (hereinafter, "initial zone for placement") in response to a formal summons after the beginning of play of the users U-m1 and U-m2. However, the initial placement zone is in the field Fd and is other than the Main Deck Zone Zmd[q] and the Extra Deck Zone Zed[q].

As described above, when the card C with a card ID is a Standard Monster Card CKH, the Main Monster Zones Zm[q] are set as the initial zone for placement of the Standard Monster Card CKH.

When the card C with a card ID is a Link Monster Card CEL, the Extra Monster Zones Ze, and the Main Monster Zones Zm[q] with the properties of a Link Zone ZL are set as the initial zone for placement of the Link Monster Card CEL.

When the card C with a card ID is a Specific Monster Card CET, the Main Monster Zones Zm[q] and the Extra Monster Zones Ze are set as the initial zone for placement of the Specific Monster Card CET.

When the card C with a card ID is a Pendulum Monster Card CKP, the Main Monster Zones Zm[q] and the Pendulum Zones Zp[q] are set as the initial zone for placement of the Pendulum Monster Card CKP.

When the card C with a card ID is a Composite Monster Card CF, the Main Monster Zones Zm[q] and the Extra Monster Zones Ze are set as the initial zone for placement of the Composite Monster Card CF.

When the card C with a card ID is a Magic Card Cy, the Magic Trap Zones Zw[q] and the Field Zones Zf[q] are set as the initial zone for placement of the Magic Card Cy.

When the card C with a card ID is a Trap Card Cz, the Magic Trap Zones Zw[q] or the Field Zones Zf[q] are set as the initial zone for placement of the Trap Card Cz.

The destruction placement information is as follows: There are two cases below. One is a case in which the card ID with a corresponding card ID is a Monster Card Cx, and the Monster Card Cx is destroyed. The other one is a case in which the card ID is a Magic Card Cy or a Trap Card Cz, and either one loses its effect. In these cases, the destruction placement information indicates (i) a type of a zone in which any card C from among these cards is placed (hereinafter, "destruction placement zone") and (ii) a placement mode.

As described above, when the card C with a card ID is any one of a Standard Monster Card CKH, an Extra Monster Card CE, a Magic Card Cy and a Trap Card Cz, the destruction placement zone is the Graveyard Zone Zb[q], and the placement mode is face-up. When the card C with a card ID is a Pendulum Monster Card CKP or a Composite Monster Card CF, the destruction placement zone is the Extra Deck Zone Zed[q], and the placement mode is face-up.

The forced-transfer placement information is as follows: There is a case in which the card C with a card ID is a Monster Card Cx, and the Monster Card Cx is forced to be moved by the forced transfer power of another card C. In this case, the forced-transfer placement information indicates (i) a type of a zone in which the Monster Card Cx is to be placed (hereinafter, "forced-transfer placement zone"), and (ii) a placement mode.

As described above, when the card C with a card ID is a Basic Monster Card CK, the forced-transfer placement zone is a Hand Card Zone Zt[q], and the placement mode is face-up. When the card C with a card ID is an Extra Monster Card CE or a Composite Monster Card CF, the forced-transfer placement zone is the Extra Deck Zone Zed[q], and the placement mode is face-down.

The resurrection placement information is as follows: There is a case in which the card C with a card ID is a Monster Card Cx, and the Monster Card Cx is resurrected by the resurrection power of another card C after the Monster Card Cx is placed on the Graveyard Zone Zb[q]. In this case, the resurrection placement information indicates a type of a zone in which the Monster Card Cx is to be placed (hereinafter, "resurrection placement zone").

As described above, when the card C with a card ID is a Standard Monster Card CKH or an Extra Monster Card CE, the resurrection placement zone is the Main Monster Zone Zm[q]. When the card C with a card ID is a Pendulum Monster Card CKP or a Composite Monster Card CF, the resurrection placement zone is the Main Monster Zone Zm[q].

Although detailed description is omitted, in some cases, a Pendulum Monster Card CKP or a Composite Monster Card CF is placed on the Graveyard Zone Zb[q] under certain conditions after either one is placed face-up on the Extra Deck Zone Zed[q].

The face-up reposition information is as follows: There is a case in which the card C with a card ID is a Monster Card Cx, and the Monster Card Cx is resurrected by the resurrection power of another card C after the Monster Card Cx is placed face-up on the Extra Deck Zone Zed[q]. In this case, the face-up card reposition information indicates a type of a zone in which the Monster Card Cx is to be placed (hereinafter, "face-up card reposition zone"). As described above, when the card C with a card ID is a Pendulum Monster Card CKP or a Composite Monster Card CF, the face-up card reposition zone is any of the Extra Monster Zones Ze, and the Main Monster Zones Zm[q] with the properties of a Link Zone ZL.

The face-down reposition information is follows: There is a case in which the card C with a card ID is a Monster Card Cx, and the Monster Card Cx is repositioned by the reposition power of another card C after it is placed face-down on the Extra Deck Zone Zed[q]. In this case, the face-down card reposition information indicates a type of a zone in which the Monster Card Cx is to be placed (hereinafter, "face-down card reposition zone").

As described above, when the card C with a card ID is a Link Monster Card CEL, the face-down card reposition zone is any of the Extra Monster Zones Ze, and the Main Monsters Zone Zm[q] with the properties of a Link Zone ZL. When the card C with a card ID is a Specific Monster Card CET or a Composite Monster Card CF, the face-down card reposition zone is any of the Main Monster Zones Zm[q] and the Extra Monster Zones Ze.

When the card C with a card ID is a Monster Card Cx, the monster card information indicates the level, attack power, and defense power of a monster corresponding to the Monster Card Cx.

When the card C with a card ID is a Magic Card Cy, the magic card information includes magic effect information relating to effects obtained by the Magic Card Cy, and magic effect activation timing information relating to a timing of when the effects thereof are activated.

When the card C with a card ID is a Trap Card Cz, the trap effect information includes trap effect information relating to effects obtained by the Trap Card Cz, and trap effect activation timing information relating to a timing of when the effects thereof are activated.

Figures 18, 19:
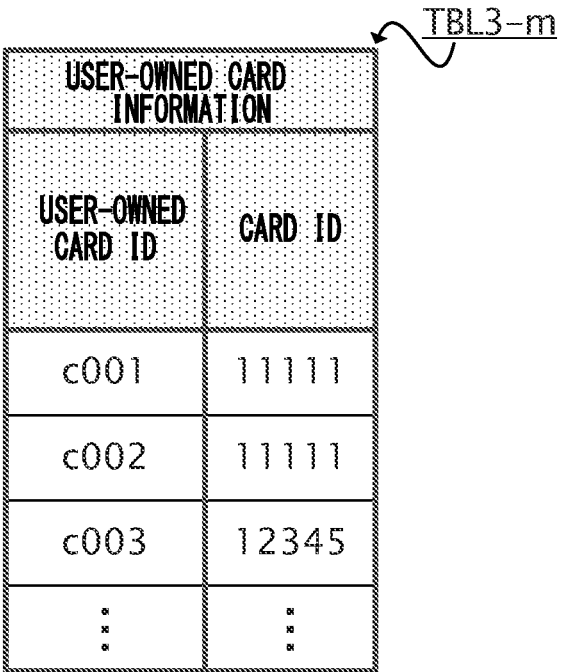
FIG. 18 illustrates an example of a data structure of a user information table TBL2.
FIG. 19 illustrates an example of a data structure of a user-owned card information table TBL3-$m$.

FIG. 18 illustrates an example of a data structure of a user information table TBL2.

As shown in FIG. 18, the user information table TBL2 include M records that correspond to one-to-one to M users U who are playing the card game. Each record in the user information table TBL2 includes a user ID and user information corresponding to the user ID.

The user ID is used to uniquely identify each user U from among the M users U-1 to U-M who are playing the card game. The user information of each record includes a user name of a corresponding card ID, and a battle history of the user U in the card game.

The user-owned card information table TBL3 includes M user-owned card information tables TBL3-1 to TBL3-M that correspond one-to-one to the M users U-1 to U-M who are playing the card game.

FIG. 19 illustrates an example of a data structure of a user-owned card information table TBL3-m corresponding to a user U-m.

As shown in FIG. 19, the user-owned card information table TBL3-m includes records that correspond one-to-one to all of the cards C of the user U-m. Each record in the user-owned card information table TBL3-m includes user-owned card information.

The user-owned card information of each record includes a user-owned card ID and a card ID. The user-owned card ID is information to uniquely identify each card C owned by the user U-m from among all the cards C of the user U-m.

The main deck information table TBL4 includes M main deck information tables TBL4-1 to TBL4-M that correspond one-to-one to the M users U-1 to U-M who are playing the card game.

FIG. 20 illustrates an example of a data structure of a main deck information table TBL4-m corresponding to a user U-m.

As shown in FIG. 20, the main deck information table TBL4-m includes one or more records that correspond one-to-one to one or more Main Decks DM-m of the user U-m. Each record in the main deck information table TBL4-m includes a main deck ID and main deck configuration information.

The main deck ID is information to uniquely identify each Main Deck DM-m built by the user U-m from among one or more main decks DM-m of the user U-m. The main deck configuration information of each record includes user-owned card IDs that correspond one-to-one to cards C included in the Main Deck DM-m.

The extra deck information table TBL5 includes M extra deck information tables TBL5-1 to TBL5-M that correspond one-to-one to M users U-1 to U-M who are playing the card game.

FIG. 21 illustrates an example of a data structure of an extra deck information table TBL5-m corresponding to a user U-m.

As shown in FIG. 21, the extra deck information table TBL5-m includes one or more records that correspond one-to-one to one or more Extra Decks DE-m of the user U-m. Each record in the extra deck information table TBL5-m includes an extra deck ID and extra deck configuration information.

The extra deck ID is information to uniquely identify one or more Extra Decks DE-m constructed by the user U-m from among one or more Extra Decks DE-m of the user U-m. The extra deck configuration information of each record includes user-owned card IDs that correspond one-to-one to cards C included in the Extra Deck DE-m corresponding to the extra deck ID.

FIG. 22 illustrates an example of a data structure of the zone information table TBL6.

As shown in FIG. 22, the zone information table TBL6 includes records that correspond one-to-one to zones included in the field Fd and the user information display area Ar[q] during the play of the users U-m1 and U-m2. Each record in the zone information table TBL6 includes a zone ID and zone information.

The zone ID is information to uniquely identify each zone from among the multiple zones contained in the field Fd and the user information display area Ar[q]. Zone information of each record includes affiliation field information, zone type information, and zone position information.

The affiliation field information indicates to which of the following a zone with a zone ID belongs: the user fields Fu[m1] and Fu[m2], the user information display areas Ar[m1] and Ar[m2], and the shared field Fe.

The zone type information indicates to which of the following a zone with a zone ID belongs: the Main Monster Zone Zm[q], the Magic Trap Zone Zw[q], the Main Deck Zone Zmd[q], the Extra Deck Zone Zed[q], the Field Zone Zf[q], the Graveyard Zone Zb[q], and the Hand Card Zone Zt[q].

The zone position information indicates a position of the zone with a zone ID in the field Fd or the user information display area Ar[q].

FIG. 23 illustrates an example of a data structure of the game status information table TBL7.

As shown in FIG. 23, the game status information table TBL7 includes game status information. The game status information includes first player information, second player information, and turn information.

The first player information includes: a user ID of a user U whose turn will be first between the users U-m and U-m2 (hereinafter, this user U is referred to as "first player."); a user name of the first player; remaining of life points of the first player; a main deck ID of the Main Deck DM-q used by the first player during the play; an extra deck ID of the Extra Deck DE-q used by the first player during the play.

The second player information includes: a user ID of a user U whose turn will be second between the users U-m1 and U-m2 (hereinafter, this user U is referred to as "second player."); a user name of the second player; remaining of life points of the second player; a main deck ID of the Main Deck DM-q used by the second player during the play; an extra deck ID of the Extra Deck DE-q used by the second player during the play.

The turn information includes the number of turns indicative of how many turns this is at the current time during the card game, and a user ID of a user U who progress the card game in this turn.

The card status information table TBL8 includes card status information tables TBL8-*q* that correspond one-to-one to users U-q who are playing the card game.

FIG. 24 illustrates an example of a data structure of each card status information table TBL8-*q*.

As shown in FIG. 24, the card status information table TBL8-*q* includes records that correspond one-to-one to cards C including (i) cards C included in the Main Deck DM-q and (ii) cards C included in the Extra Deck DE-q used by the user U-q during the play. Each record in the card status information table TBL8-*q* includes a play-in-use card ID and card status information.

The play-in-use card ID is one of user-owned card IDs corresponding one-to-one to cards C of the user U-q who is playing the card game, and it indicates either of the following: (i) a user-owned card ID of cards C that is included in the Main Deck DM-q used during the play; and (ii) a user-owned card ID of cards C that is included in the Extra Deck DE-q used during the play. Hereinafter, each of the cards C with the user-owned card ID labeled in the above (i) and each of the cards C with the user-owned card ID labeled in the above (ii) are referred to as "play-in-use cards."

The card status information includes card placement zone information, card placement mode information, and card placement status information.

The card placement zone information of each record indicates a zone ID of the zone in which the play-in-use card with a play-in-use card ID is placed. The card placement mode information indicates a placement mode of the play-in-use card with a play-in-use card ID.

The card placement status information of each record indicates a placement status of the play-in-use card with a play-in-use card ID. In this embodiment, examples of the placement status include initial deck placement status, initial field placement status, destruction placement status, forced transfer placement status, resurrection placement status, face-up reposition status, and face-down reposition status.

The initial deck placement status indicates either of the following statuses:

(i) a status in which a play-in-use card has been faced-down, as a main card, on the Main Deck Zone Zmd[q] since the play of the users U-m1 and U-m2 started; or (ii) a status in which the play-in-use card has been faced-down, as an extra card, on the Extra Deck Zone Zed[q].

When the play-in-use card is in the initial deck placement status, the card manager 312 determines the type of a zone in which the play-in-use card can be moved based on the initial field placement information.

The field initial placement status indicates either of the following statuses:

(i) a status in which a play-in-use card that is a Monster Card Cx is placed first on any one of the Main Monster Zones Zm[q], the Extra Monster Zones Ze and the Pendulum Zone Zp[q] after the beginning of the play of the users U-m1 and U-m2; or (ii) a status in which a play-in-use card that is a Magic Card Cy or a Trap Card Cz is placed first on either the Magic Trap Zone Zw[q] or the Field Zone Zf[q] after the beginning of the play.

When the play-in-use card is in the initial field placement status, the card manager 312 determines the type of a zone to which the play-in-use card can be moved based on either the destruction placement information or the forced-transfer placement information.

The destruction placement information indicates any of the following statuses:

(i) a status in which a play-in-use card that is a Standard Monster Card CKH or an Extra Monster Card CE is placed face-up on the Graveyard Zone Zb[q] after the play-in-use card is destroyed;

(ii) a status in which a play-in-use card that is a Pendulum Monster Card CKP or a Composite Monster Card CF is placed face-up on the Extra Deck Zone Zed[q] after the play-in-use card is destroyed; and (iii) a status in which a play-in-use card that is a Magic Card Cy or a Trap Card Cz is placed face-up on the Graveyard Zone Zb[q] after the play-in-use card has lost its effect.

When the play-in-use card is in the destruction placement status, the card manager 312 determines the type of a zone to which the play-in-use card can be moved based on either the resurrection placement information or the face-up reposition information.

The forced transfer placement status indicates either of the following statuses:

(i) a status in which a play-in-use card that is a Basic Monster Card CK is placed face-up on the Hand Card Zone Zt[q] after the play-in-use card is forced to be moved; or (ii) a status in which a play-in-use card that is an Extra Monster Card CE or a Composite Monster Card CF is placed face-down on the Extra Deck Zone Zed[q] after the play-in-use card is forced to be moved.

When the play-in-use card that is a Basic Monster Card CK is in the forced transfer placement status, the card manager 312 determines the type of a zone in which the play-in-use card can be moved based on the initial field placement information. When the play-in-use card that is an Extra Monster Card CE or a Composite Monster Card CF is in the forced transfer placement status, the card manager 312 determines the type of a zone to which the play-in-use card can be moved based on the face-down reposition information.

The resurrection placement status is a status in which a play-in-use card that is a Monster Card Cx is placed face-up on the Main Monster Zone Zm[q] after the play-in-use card is resurrected from the Graveyard Zone Zb[q].

When the play-in-use card that is a Monster Card Cx is in the resurrection placement status, the card manager 312 determines the type of a zone in which the play-in-use card can be moved based on either the destruction placement information or the forced-transfer placement information.

The face-up reposition status is a status in which, after a play-use card that is a Pendulum Monster Card CKP or a Composite Monster Card CF placed face-up on the Extra Deck Zone Zed[q] is resurrected, the play-use card is placed face-up on any of the Extra Monster Zones Ze and the Main Monster Zones Zm[q] with the properties of a Link Zone ZL.

When the play-in-use card that is a Pendulum Monster Card CKP or a Composite Monster Card CF is in the face-up reposition status, the card manager 312 determines the type of zone to which the play-in-use card can be moved based on either the destruction placement information or the forced-transfer placement information.

The face-down reposition status indicates either of the following statuses:

(i) a status in which a play-in-use card that is a Link Monster Card CEL placed face-down on the Extra Deck Zone Zed[q] is repositioned, thereby being placed face-up on any of the Extra Monster Zones Ze, and the Main Monster Zones Zm[q] with properties of a Link Zone ZL; or (ii) a status in which a play-in-use card that is a Specific Monster Card CET or a Composite Monster Card CF placed face-down on the Extra Deck Zone Zed[q] is repositioned, thereby being placed face-up on any of and the Main Monster Zones Zm[q] and the Extra Monster Zones Ze.

When the play-in-use card that is an Extra Monster Card CE or a Composite Monster Card CF is in the face-down reposition status, the card manager 312 determines the type of a zone to which the play-in-use card can be moved based on either the destruction placement information or the forced-transfer placement information.

6. Game System Procedures

The procedures of the game system 1 will be described below with reference to FIGS. 25 through 27.

Figure 25:
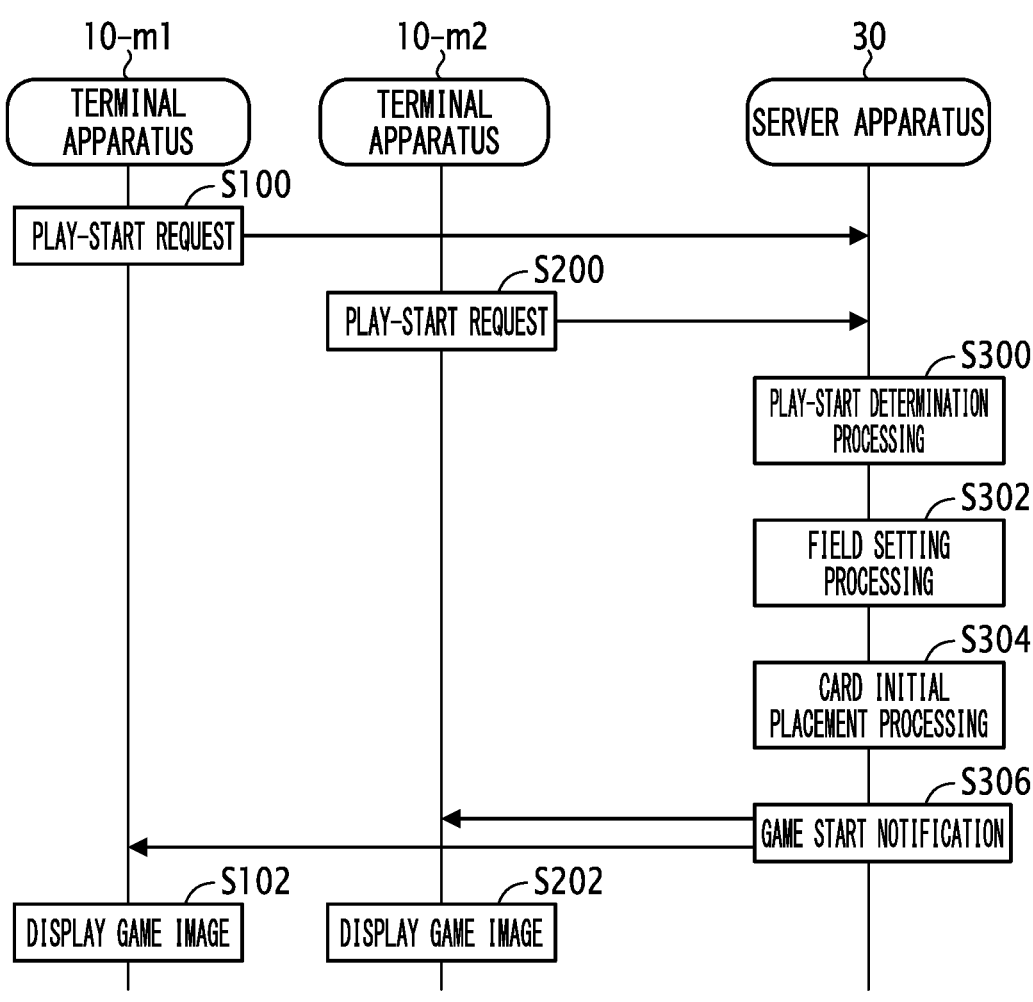
FIG. 25 illustrates an example of a sequence chart of the game system 1.
Figure 26:
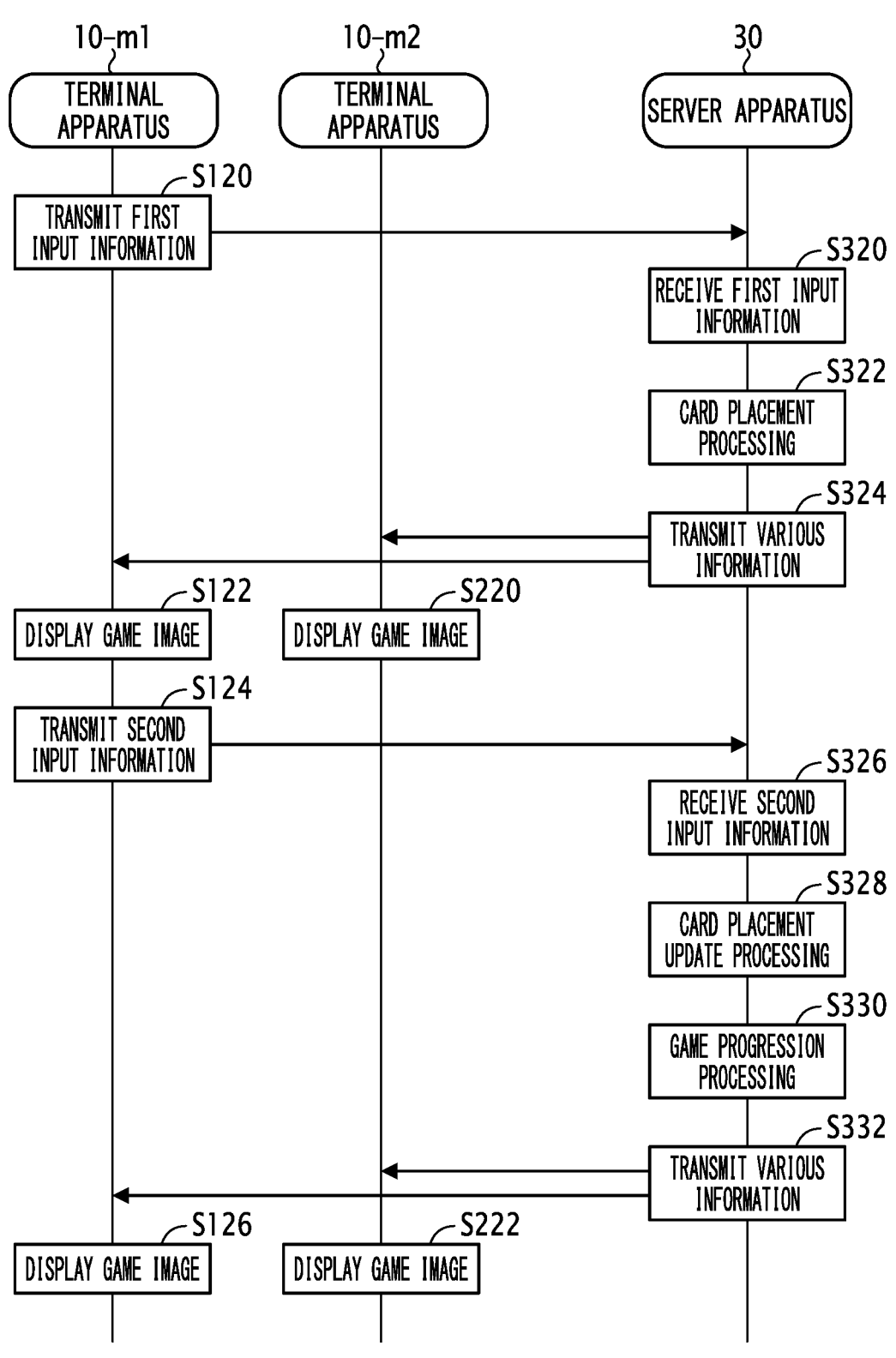
FIG. 26 illustrates an example of a sequence chart of the game system 1.
Figure 27:
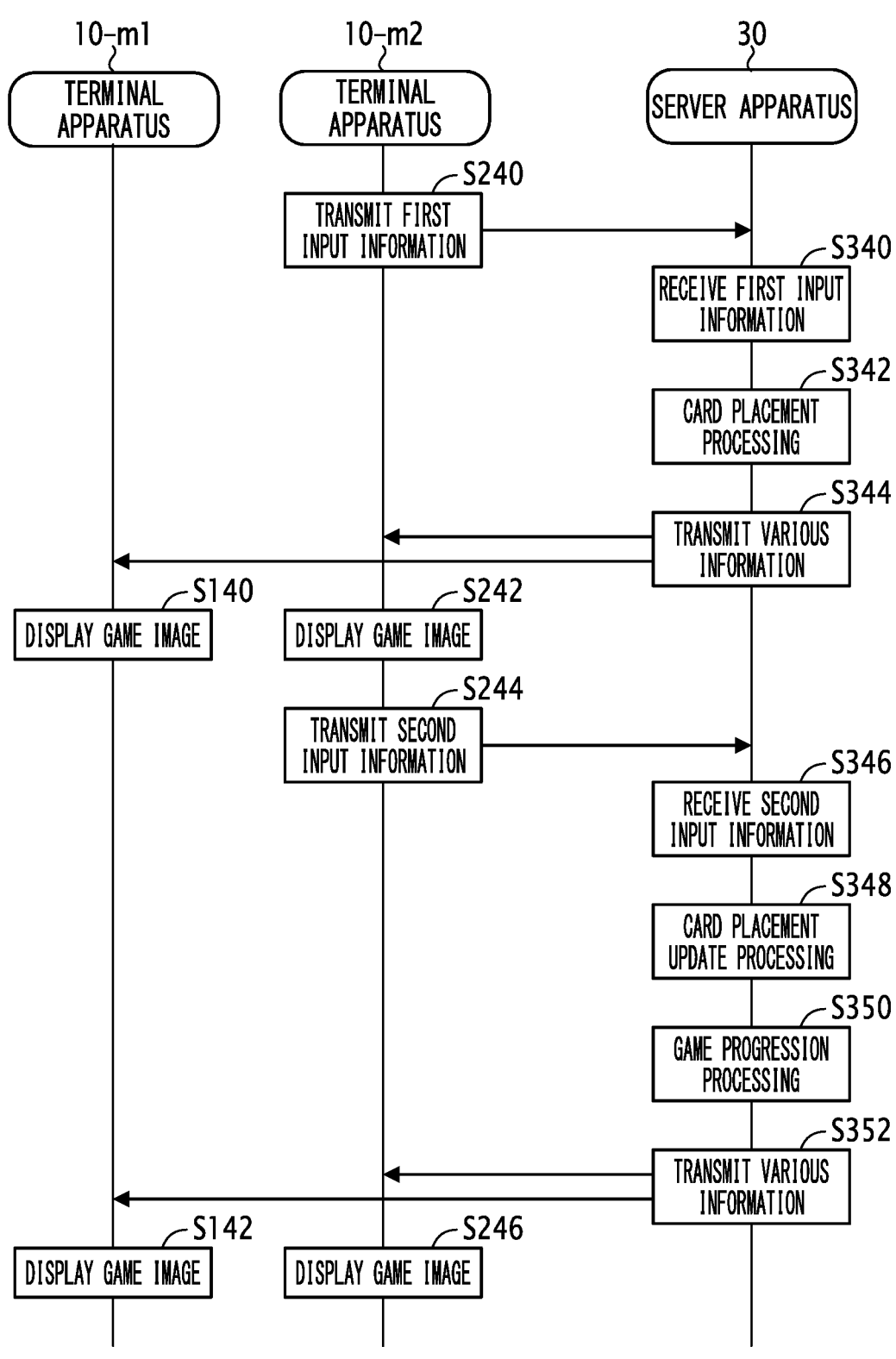
FIG. 27 illustrates an example of a sequence chart of the game system 1.

Each of FIGS. 25 through 27 illustrates an example of a sequence chart of the game system 1 during a card game played by the user U-m of the terminal apparatus 10-*m*1 and the user U-m2 of the terminal apparatus 10-*m*2.

As shown in FIG. 25, in response to a user input to the input section 14-*m*1, the user input being made by the user U-m1 of the terminal apparatus 10-*m*1 and being for a request to start the card game, the terminal control section 11 of the terminal apparatus 10-*m*1 controls each element thereof to transmit a play-start request to the server apparatus 30 (S100).

Similarly, in response to a user input to the input section 14-*m*2, the user input being made by the user U-m2 of the terminal apparatus 10-*m*2 and being for a request to start the card game, the terminal control section 11 of the terminal apparatus 10-*m*2 controls each element thereof to transmit a play-start request to the server apparatus 30 (S200).

The game progressor 313 of the server apparatus 30 executes play-start determination processing, when the server apparatus 30 receives the play-start requests from the terminal apparatuses 10-*m*1 and 10-*m*2 (S300). Specifically, at step S300 of the play-start determination processing, the game progressor 313 determines the start of play of the two users, the user U-m1 of the terminal apparatus 10-*m*1, and the user U-m2 of the terminal apparatus 10-*m*2. Furthermore, at step S300, the game progressor 313 sets information relating to the user U-m1 to the first player information of the game status information, and it sets information relating to the user U-m2 to the second player information of the game status information. The game progressor 313 then initializes the turn information of the game status information.

Next, the field manager 311 of the server apparatus 30 executes field setting processing (S302). Specifically, at step S302 of the field setting processing, the field manager 311 sets various zones to the field Fd and the user information display area Ar[q], based on the zone information.

Next, the card manager 312 of the server apparatus 30 executes card initial placement processing (S304). Specifically, at step S304 of the card initial placement processing, the card manager 312 updates the card status information, based on the main deck configuration information and the extra deck configuration information. The card manager 312 then place the Main Deck DM-q and the Extra Deck DE-q of the user U-q on the field Fd.

Next, the game progressor 313 of the server apparatus 30 transmits a game start notification to the terminal apparatuses 10-*m*1 and 10-*m*2 (S306). In this embodiment, the game start notification includes game status information, zone information, main deck configuration information, extra deck configuration information, and card status information.

When the terminal apparatus 10-*m*1 receives the game start notification from the server apparatus 30, the display information generator 112 of the terminal apparatus 10-*m*1 displays a game image G-m1 on the display section 15-*m*1 based on information included in the game start notification (S102). Similarly, when the terminal apparatus 10-*m*2 receives the game start notification from the server apparatus 30, the display information generator 112 of the terminal apparatus 10-*m*2 displays a game image G-m2 on the display section 15-*m*2 based on information included in the game start notification (S202). As a result, the card game has started between the user U-m1 of the terminal apparatus 10-*m*1 and the user U-m2 of the terminal apparatus 10-*m*2.

As shown in FIG. 26, in response to a user input to the input section 14-*m*1, the user input being made by the user U-m1 of the terminal apparatus 10-*m*1 and being for placing a card C-1 on the field Fd, the terminal control section 11 of the terminal apparatus 10-*m*1 controls each element thereof to transmit first input information indicative of this user input to the server apparatus 30 (S120).

Thereafter, the data acquirer 314 of the server apparatus 30 acquires the first input information transmitted from terminal apparatus 10-*m*1 (S320).

Next, the card manager 312 of the server apparatus 30 executes card placement processing (S322). The card placement processing is processing to update the card status information based on the card placement information and the first input information acquired at step S320.

Next, the game progressor 313 of the server apparatus 30 transmits the card status information to the terminal apparatuses 10-m1 and 10-m2 (S324).

When the terminal apparatus 10-m1 receives the card status information from the server apparatus 30, the display information generator 112 of the terminal apparatus 10-m1 displays a game image G-m1 on the display section 15-m1 based on the card status information (S122). Similarly, the terminal apparatus 10-m2 receives the card status information from the server apparatus 30, the display information generator 112 of the terminal apparatus 10-m2 displays a game image G-m2 on the display section 15-m2 based on the card status information (S220).

Next, in response to a user input to the input section 14-m1, the user input being made by the user U-m1 of the terminal apparatus 10-m1 and being for use of a card C-1 (e.g., the user U-m1 attacks the card C-2 or the user U-m2 by use of a card C-1.), the terminal control section 11 of the terminal apparatus 10-m1 controls each element thereof to transmit second input information indicative of this user input to the server apparatus 30 (S124).

Thereafter, the data acquirer 314 of the server apparatus 30 acquires the second input information transmitted from the terminal apparatus 10-m1 (S326).

Next, the card manager 312 of the server apparatus 30 executes card placement update processing (S328). The card placement update processing is a processing to update card status information based on the card placement information and the second input information acquired at step S326.

Furthermore, the game progressor 313 of the server apparatus 30 executes game progression processing (S330). The game progression processing is a processing to update the game status information based on the monster card information and the second input information acquired at step S326. When the life point of either the user U-m1 or the user U-m2 reaches "0" at step S330, the game progressor 313 ends the processing shown in FIGS. 25 through 27. At step S330, the game progressor 313 adds "1" to the number of turns indicated by the turn information.

Thereafter, the game progressor 313 of the server apparatus 30 transmits game status information and card status information to the terminal apparatuses 10-m1 and 10-m2 (S332).

When the terminal apparatus 10-m1 receives the game status information and the card status information from the server apparatus 30, the display information generator 112 of the terminal apparatus 10-m1 displays a game image G-m1 on the display section 15-m1 based on the received information (S126). Similarly, when the terminal apparatus 10-m2 receives the game status information and the card status information from the server apparatus 30, the display information generator 112 of the terminal apparatus 10-m2 displays a game image G-m2 on the display section 15-m2 based on the received information (S222).

As shown in FIG. 27, in response to a user input to the input section 14-m2, the user input being made by the user U-m2 of the terminal apparatus 10-m2 and being for placing a card C-2 on the field Fd, the terminal control section 11 of the terminal apparatus 10-m2 controls each element thereof to transmit the first input information indicative of this user input to the server apparatus 30 (S240).

Thereafter, the data acquirer 314 of the server apparatus 30 acquires the first input information transmitted from the terminal apparatus 10-m2 (S340).

Next, the card manager 312 of the server apparatus 30 executes the card placement processing based on the card placement information and the first input information acquired at step S340 (S342).

Next, the game progressor 313 of the server apparatus 30 transmits card status information to the terminal apparatuses 10-m1 and 10-m2 (S344).

When the terminal apparatus 10-m1 receives the card status information from the server apparatus 30, the display information generator 112 of the terminal apparatus 10-m1 displays a game image G-m1 on the display section 15-m1 based on the card status information (S140). Similarly, when the terminal apparatus 10-m2 receives the card status information from the server apparatus 30, the display information generator 112 of the terminal apparatus 10-m2 displays a game image G-m2 on the display section 15-m2 based on the card status information (S242).

Next, in response to a user input to the input section 14-m2, the user input being made by the user U-m2 of the terminal apparatus 10-m2 and being for use of a card C-2 (e.g., the user U-m2 attacks a card C-1 or the user U-m1 by use of a card C-2.), the terminal control section 11 of the terminal apparatus 10-m2 controls each element thereof to transmit second input information indicative of this user input to the server apparatus 30 (S244).

Thereafter, the data acquirer 314 of the server apparatus 30 acquires the second input information transmitted from the terminal apparatus 10-m2 (S346).

Next, the card manager 312 of the server apparatus 30 executes the card placement update processing based on the card placement information and the second input information acquired at step S346 (S348).

The game progressor 313 of the server apparatus 30 executes the game progression processing based on the monster card information and the second input information acquired at step S346 (S350). When the life point of either the user U-m1 or the user U-m2 reaches "0" at step S350, the game progressor 313 ends the processing shown in FIGS. 25 through 27. At step S350, the game progressor 313 adds "1" to the number of turns indicated by the turn information.

Thereafter, the game progressor 313 of the server apparatus 30 transmits game status information and card status information to the terminal apparatuses 10-m1 and 10-m2 (S352).

When the terminal apparatus 10-m1 receives the game status information and the card status information from the server apparatus 30, the display information generator 112 of the terminal apparatus 10-m displays a game image G-m1 on the display section 15-m1 based on the received information (S142). Similarly, when the terminal apparatus 10-m2 receives the game status information and the card status information from the server apparatus 30, the display information generator 112 of the terminal apparatus 10-m2 displays a game image G-m2 on the display section 15-m2 based on the received information (S246).

Thereafter, the game system 1 repeats the processing shown in FIGS. 26 27 until the life points of either the user U-m1 or the user U-m2 reaches "0."

Thus, in this embodiment, the card manager 312 sets Standard Monster Cards CKH as main cards and places them face-down on the Main Deck Zone Zmd[q] at the beginning of play of the users U-m1 and U-m2.

When a Standard Monster Card CKH is placed half face-up on a Hand Card Zone Zt[q], the card manager 312 allows the Standard Monster Card CKH placed half face-up on the Hand Card Zone Zt[q] to be placed on a Main Monster Zone Zm[q] in response to a user input made by the user U-q.

When a Standard Monster Card CKH is destroyed, the card manager 312 places the Standard Monster Card CKH face-up on the Graveyard Zone Zb[q].

When a Standard Monster Card CKH is forced to be moved by the forced transfer power of another card C, the card manager 312 places the Standard Monster Card CKH half face-up on a Hand Card Zone Zt[q].

When a Standard Monster Card CKH is resurrected by the resurrection power of another card C, the card manager 312 places the Standard Monster Card CKH face-up on a Main Monster Zone Zm[q].

In this embodiment, the card manager 312 sets Specific Monster Cards CET as extra cards and places them face-down on the Extra Deck Zone Zed[q] at the beginning of play of the users U-m1 and U-m2. Alternatively, the card manager 312 may set the Specific Monster Cards CET to extra cards and may place them half face-up on the Extra Deck Zone Zed[q] at the beginning of the play.

In response to a user input made by the user U-q, the card manager 312 allows a Specific Monster Card CET, which is set as an extra card and is placed face-down on the Extra Deck Zone Zed[q], to be placed on the zone selected by the user U-q from among the Main Monster Zones Zm[q] and the Extra Monster Zones Ze.

When a Specific Monster Card CET is destroyed, the card manager 312 places face-up the Specific Monster Card CET on the Graveyard Zone Zb[q].

When a Specific Monster Card CET is forced to be moved by the forced transfer power of another card C, the card manager 312 sets the Specific Monster Card CET as an extra card and places it face-down on the Extra Deck Zone Zed[q].

When a Specific Monster Card CET is resurrected by the resurrection power of another card C, the card manager 312 places the Specific Monster Card CET face-up on a Main Monster Zone Zm[q].

When a Specific Monster Card CET is repositioned by the reposition power of another card C, the card manager 312 allows the Specific Monster Card CET to be placed face-up on the zone selected by the user U-q from among the Main Monster Zones Zm[q] and the Extra Monster Zones Ze, in response to a user input made by the user U-q.

In this embodiment, the card manager 312 sets Link Monster Cards CEL as extra cards and places them face-down on the Extra Deck Zone Zed[q] at the beginning of play of the users U-m1 and U-m2. Alternatively, the card manager 312 may set the Link Monster Cards CEL to extra cards and may place them half face-up on the Extra Deck Zone Zed[q] at the beginning of the play.

In response to a user input made by the user U-q, the card manager 312 allows the Link Monster Card CEL, which is set as an extra card and is placed face-down on the Extra Deck Zone Zed[q], to be placed on the zone selected by the user U-q from among the Extra Monster Zones Ze and the Main Monster Zones Zm[q] with the properties of a Link Zone ZL.

When a Link Monster Card CEL is destroyed, the card manager 312 places the Link Monster Card CEL face-up on the Graveyard Zone Zb[q].

When a Link Monster Card CEL is forced to be moved by the forced transfer power of another card C, the card manager 312 sets the Link Monster Card CEL as an extra card and places it face-down on the Extra Deck Zone Zed[q].

When a Link Monster Card CEL is resurrected by the resurrection power of another card C, the card manager 312 places the Link Monster Card CEL face-up on a Main Monster Zone Zm[q].

When a Link Monster Card CEL is repositioned by the reposition power of another card C, the card manager 312 allows the Link Monster Card CEL to be placed face-up on the zone selected by the user U-q from among the Extra Monster Zones Ze, and the Main Monster Zones Zm[q] with the properties of a Link Zone ZL, in response to a user input made by the user U-q.

In this embodiment, the card manager 312 sets Pendulum Monster Cards CKP as main cards and places them face-down on the main deck zone Zmd[q] at the beginning of play of the users U-m1 and U-m2.

When a Pendulum Monster Card CKP is placed half face-up on the Hand Card Zone Zt[q], the card manager 312 allows the Pendulum Monster Card CKP placed half face-up on a Hand Card Zone Zt[q] to be placed on a Main Monster Zone Zm[q] in response to a user input made by the user U-q.

When a Pendulum Monster Card CKP is placed half face-up on the Hand Card Zone Zt[q], the card manager 312 allows the Pendulum Monster Card CKP placed half face-up on a Hand Card Zone Zt[q] to be placed on the Pendulum Zone Zp[q] in response to a user input made by the user U-q.

When a Pendulum Monster Card CKP is destroyed, the card manager 312 places the Pendulum Monster Card CKP face-up on the Extra Deck Zone Zed[q].

When a Pendulum Monster Card CKP is forced to be moved by the forced transfer power of another card C, the card manager 312 places the Pendulum Monster Card CKP half face-up on a Hand Card Zone Zt[q].

When a Pendulum Monster Card CKP is resurrected by the resurrection power of another card C, the card manager 312 allows the Pendulum Monster Card CKP to be placed face-up on the zone selected by the user U-q from among the Extra Monster Zones Ze, and the Main Monster Zones Zm[q] with the properties of a Link Zone ZL.

In this embodiment, the card manager 312 sets Composite Monster Cards CF as extra cards and places them face-down on the Extra Deck Zone Zed[q] at the beginning of play of the users U-m1 and U-m2. Alternatively, the card manager 312 sets the Composite Monster Card CF as extra cards and places them half face-up on the Extra Deck Zone Zed[q] at the beginning of the play.

The card manager 312 allows a Composite Monster Card CF, which is set as an extra card and is placed face-down on the Extra Deck Zone Zed[q], to be placed on the zone selected by the user U-q from among the Main Monster Zones Zm[q] and the Extra Monster Zones Ze, in response to a user input made by the user U-q.

When a Composite Monster Card CF is destroyed, the card manager 312 places it face-up on the Extra Deck Zone Zed[q].

When a Composite Monster Card CF is forced to be moved by the forced transfer power of another card C, the card manager 312 sets the Composite Monster Card CF as an extra card and places it face-down on the Extra Deck Zone Zed[q].

When a Composite Monster Card CF is resurrected by the resurrection power of another card C, the card manager 312 allows the Composite Monster Card CF to be placed face-up on the zone selected by the user U-q from among the Extra Monster Zones Ze, and the Main Monster Zones Zm[q] with the properties of a Link Zone ZL, in response to a user input made by the user U-q.

When a Composite Monster Card CF is repositioned by the reposition power of another card C, the card manager 312 allows the Composite Monster Card CF to be placed face-up on the zone selected by the user U-q from among the Main Monster Zones Zm[q] and the Extra Monster Zones Ze, in response to a user input made by the user U-q.

7. Summary of Embodiment

In the foregoing description of this embodiment, the Main Monster Zones Zm[q] are set as the initial zones for placement of Standard Monster Cards CKH, by the card manager 312. The Extra Monster Zones Ze, and Main Monster Zones Zm[q] with the characteristics of a Link Zone ZL are set as the initial zone for placement of Link Monster Cards CEL, by the card manager 312. The Main Monster Zones Zm[q] and the Extra Monster Zones Ze are set as the initial zone for placement of Specific Monster cards CET, by the card manager 312. The Main Monster Zones Zm[q] and the Extra Monster Zones Ze are set as the initial zone for placement of Composite Monster Cards CF, by the card manager 312. For this reason, compared to a case in which Standard Monster Cards CKH, Link Monster Cards CEL, Specific Monster Cards CET and Composite Monster Cards CF are placed anywhere on the field Fd, this embodiment enables user's strategies to be reflected in a card game and prevents the card game from being uninteresting.

In this embodiment, when a Composite Monster Card CF is placed face-up on the Extra Deck Zone Zed[q], the destination of where the Composite Monster Card CF is placed is set as any of the Extra Monster Zones Ze, and the Main Monster Zones Zm[q] with the properties of a Link Zone ZL, by the card manager 312. When a Composite Monster Card CF is placed face-down on the Extra Deck Zone Zed[q], the destination of where the Composite Monster Card CF is placed is set as any of the Main Monster Zones Zm[q] and the Extra Monster Zones Ze, by the card manager 312. For this reason, compare to a case in which the destination of where a Composite Monster Card CF is placed determined independent from the Composite Monster Card CF being face-up or face-down, this embodiment enables user's strategies to be reflected in a card game and prevents the card game from being uninteresting.

B. Modification

The foregoing embodiment can be variously modified. A specific modification mode will be described below as an example. The following example can be appropriately combined with the embodiment within a range, as long as they do not conflict with each other. In the variations illustrated below, elements of which actions and functions are equivalent to those of the embodiments will be referred to by the same symbols as in the above description, and detailed descriptions of each will be omitted as appropriate.

In the foregoing embodiment, the game system 1 includes a server apparatus 30. However, the game system 1 may not include the server apparatus 30.

Figure 28:
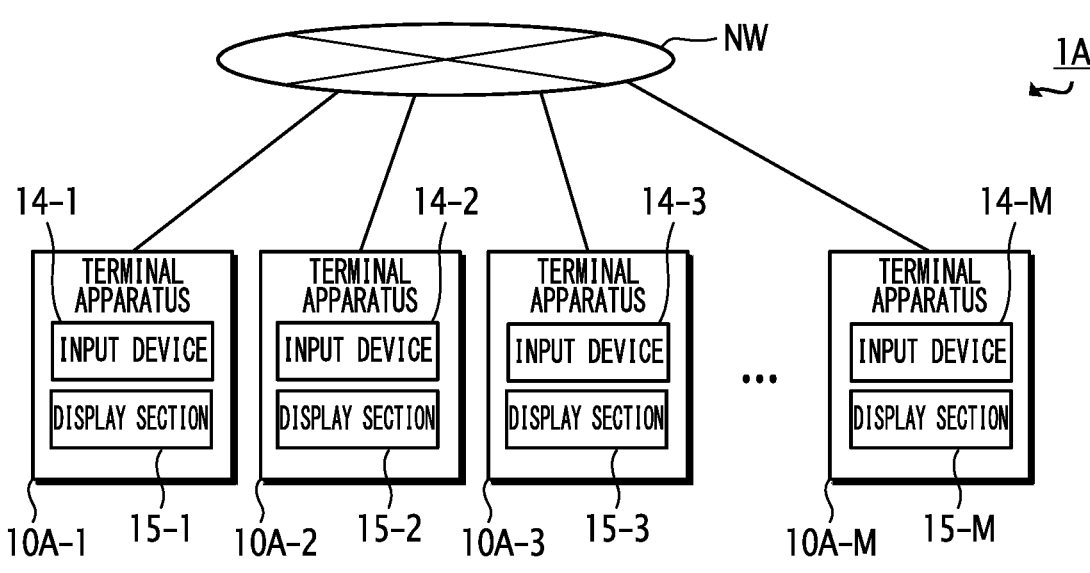
FIG. 28 illustrates an example overview of the game system 1A according to a modification.

FIG. 28 illustrates an overview of the game system 1A according to this modification. The game system 1A includes terminal apparatuses 10A (10A-1 to 10A-M). Each terminal apparatus 10A communicates with other terminal apparatuses 10A via the network NW.

Figure 29:
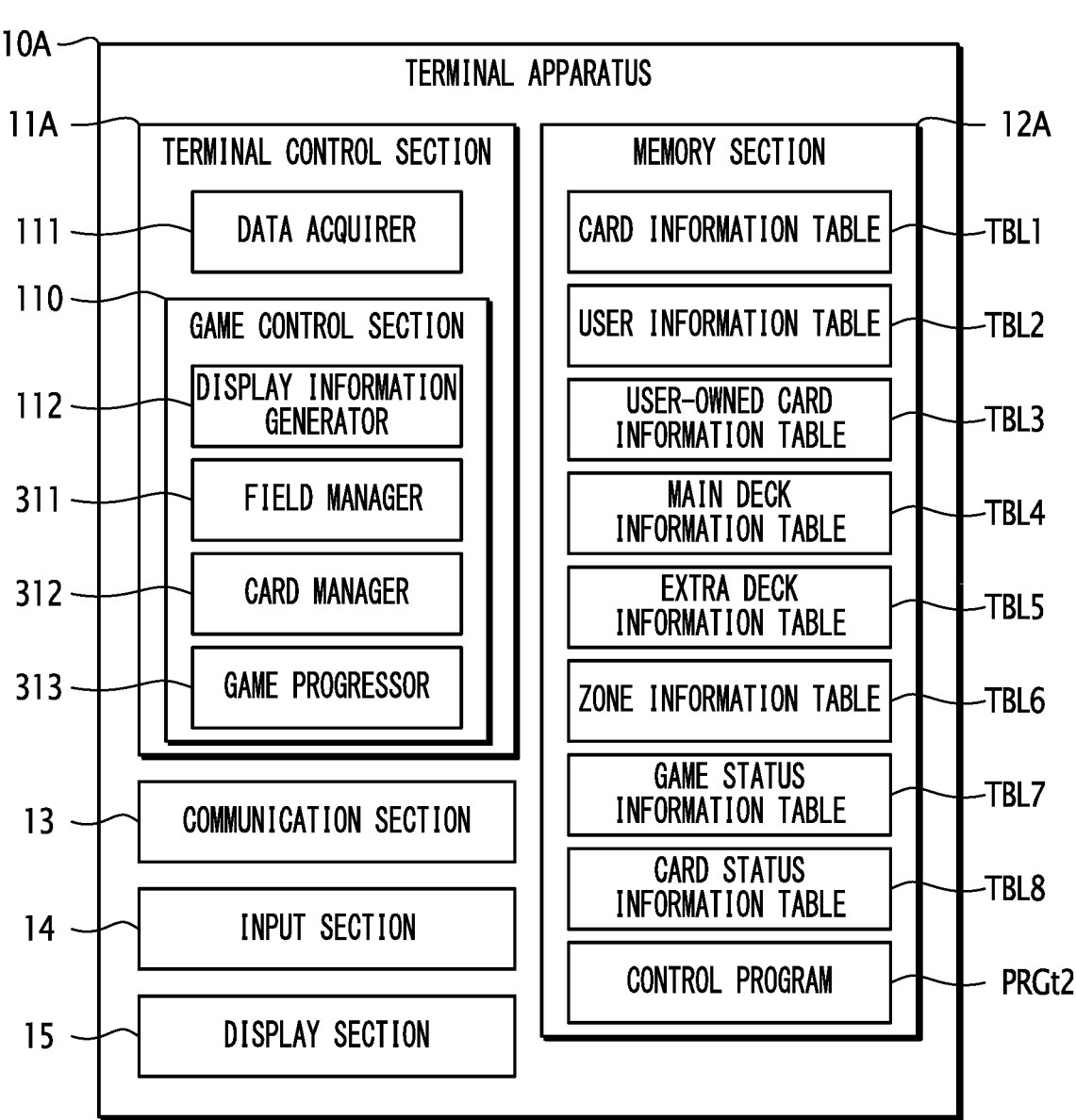
FIG. 29 is a functional block diagram showing an example of a configuration of each terminal apparatus 10A according to a modification.

FIG. 29 is a functional block diagram showing an example of a configuration of each terminal apparatus 10A. As shown in FIG. 29, each terminal apparatus 10A includes a terminal control section 11A instead of the terminal control section 11, and a memory section 12A instead of the memory section 12. In this regard, each terminal apparatus 10A differs from each terminal apparatus 10 according to the foregoing embodiment.

The terminal control section 11A includes a game control section 110. In this regard, the terminal control section 11A differs from the terminal control section 11 according to the foregoing embodiment. In addition to the display information generator 112, the game control section 110 includes afield manager 311, a card manager 312 and a game progressor 313. Instead of the control program PRGt, the memory section 12A stores a card information table TBL1, a user information table TBL2, a user-owned card information table TBL3, a main deck information table TBL4, an extra deck information table TBL5, a zone information table TBL6, a game status information table TBL7, a card status information table TBL8, and a control program PRGt2. In this regard, the memory section 12A differs from the memory section 12 according to the foregoing embodiment. The processor 1001 of each terminal apparatus 10A executes the control program PRGt2 stored in the memory 1002 and is operated in accordance with the control program PRGt2 to act as the terminal control section 11 A.

Thus, according to this modification, the terminal control section 11A includes a field manager 311, a card manager 312 and a game progressor 313. The terminal control section 11A has various information stored in the memory section 32 of the server apparatus 30 according to the foregoing embodiment. Accordingly, the terminal control section 11A can act as the server apparatus 30 according to this embodiment. In the game system 1A, the user U-m1 of the terminal apparatus 10A-m1 and the user U-m2 of the terminal apparatus 10A-m2 can play against each other in the card game while the two terminal apparatuses 10A-m1 and 10A-m2 communicate via the network NW.

C. Appendices

From the foregoing description, the present invention can be understood as follows. In order to clarify each aspect, reference numerals in the drawings are appended below in parentheses for convenience. However the present invention is not limited to the drawings.

APPENDIX 1

A non-transitory computer readable recording medium according to one aspect of the present disclosure is a non-transitory computer readable recording medium (e.g., a memory 3002) having recorded therein a program (a control program PRGs) executed by at least one processor (e.g., a processor 3001) of a server apparatus (e.g., a server apparatus 30), the program causing the at least one processor to: receive a user input made by a first user (e.g., a user U-m1) for a competitive video game (e.g., a card video game), the competitive video game using: a plurality of card objects (e.g., cards C-1) to be manipulated by the first user of a first terminal apparatus (e.g., a terminal apparatus 10-m1) that is configured to communicate with the server apparatus; and a plurality of enemy card objects (e.g., cards C-2) to be manipulated by a second user (e.g., a user U-m2) of a second terminal apparatus (e.g., a terminal apparatus 10-m2) that is configured to communicate with the server apparatus, place, on a first deck zone (e.g., a Main Deck Zone Zmd[q]), a first type card object (e.g., a Standard Monster Card CKH) from among the plurality of card objects to be manipulated by the first user; place, on a second deck zone (e.g., an Extra Deck Zone Zed[q]), a second type card object (e.g., a Link Monster Card CEL) and a third type card object (a Specific Monster Card CET) from among the plurality of card objects to be manipulated by the first user; allow the first type card object to be placed on a first area (e.g., a Main Monster Field Fm[q]) on which placement of the plurality of enemy card objects to be manipulated by the second user is not allowed, in response to a user input made by the first user; allow the second type card object placed on the second deck zone to be placed on a second area (e.g., a shared field Fe) on which placement of at least one of the plurality of enemy card objects to be manipulated by the second user is allowed, in response to a user input made by the first user; and allow the third type object card placed on the second deck zone to be placed on the first area or the second area, in response to a user input made by the first user.

According to this aspect, the area in which the first type card object can be placed is limited to the first area, and the area in which the second type card object can be placed is limited to the second area. However, both the first and second areas are allowed as areas on which the third type card object can be placed. For this reason, in order to win the game, while considering whether the first type card object is to be placed on the first area, the first user is required to determine the placement of the third type card object on the first area. Furthermore, while considering whether the second type card object is to be placed on the second area, the first user is required to determine the placement of the third type card object on the second area.

In addition, in order to win the game, while considering whether the third type card object is to be placed on the first area, the first user is required to determine the placement of the first type card object on the first area. Furthermore, while considering whether the third type card object is to be placed on the second area, the first user is required to determine the placement of the second type card object on the second area.

In other words, according to this aspect, the winner or loser of the game depends not only on the type and number of the multiple card objects to be manipulated by the first user, but also on the placement of each type of the multiple card objects to be manipulated by the first user. Thus, according to this aspect, compared to an example case (hereinafter, "Reference Example") in which the first, second and third type card objects can be freely placed on both the first and second areas, the first user is required to consider more deeply the areas in which the first, the second and third type card objects are to be placed to win the game. This requires strategies for the game.

In this aspect, the "second type card object" may be a card object that has a greater ability for the game than the "first type card object," or it may be a card object that has a greater rarity in the game than the "first type card object." The "rarity of a card object" may indicate how difficult it is for the first user to obtain the card object in the game.

In this aspect, the "third type card object" may be a card object that has a greater ability for the game than the "first type card object," or it may be a card object that has a greater rarity of the game than the "first type card object."

In this aspect, the "second area" may be an area in which the number of card objects that can be placed is fewer than in the first area.

In this aspect, the second type card object may can be placed on only a part of the second area. Furthermore, the third type card object may can be placed on only a part of the second area.

APPENDIX 2

The recording medium according to another aspect of the present disclosure is a non-transitory computer readable recording medium in Appendix 1, in which, based on the second type card object being placed on the second area, the program causes the at least one processor to allow the second type card object to be placed on an area that is a part of the first area and is indicated by the second type card object placed on the second area, in response to a user input made by the first user.

According to this aspect, the placement of the second type card object on the second area enables the second type card object to be placed on the first area. For this reason, according to this aspect, in order to win the game, while considering whether the second type card object is to be placed on the second area, the first user is required to determine the placement of the third type card object on the second area.

In addition, according to this aspect, in order to win the game, while considering whether the second type card object is to be placed on the first area, the first user is required to determine the placement of the first type card object on the first area. For this reason, according to this aspect, compared to the Reference Example, the first user is required to deeply consider areas on which the first, second and third type card objects are to be placed in order to win the game. This requires strategies for the game.

APPENDIX 3

The recording medium according to another aspect of the present disclosure is a non-transitory computer readable recording medium in Appendix 1 or 2, in which the program causes the at least one processor to: place, on the second deck zone, a fourth type card object (e.g., a Composite Monster Cards CF) from among the plurality of card objects to be manipulated by the first user such that a first surface (e.g., the back) of two surfaces included in the fourth type card object is visible to the first user; allow the fourth type card object, which is placed on the second deck zone such that the first surface is visible to the first user, to be placed on the first area or the second area, in response to a user input made by the first user; allow the fourth type object card, which is placed on the second deck zone such that a second surface (e.g., the face) of the two surfaces included in the fourth type object card is visible to the first user, to be placed on the second area, in response to a user input made by the first user; place the fourth type card object on the second deck zone such that the second surface is visible to the first user, based on a first effect (e.g., being destroyed) affecting the fourth type card object placed on the first area or the second area.

According to this aspect, when the fourth type card object is placed on the second deck zone such that the first surface is visible, both the first and second areas are allowed as being areas on which the fourth type card object can be placed. Furthermore, when the fourth type card object is placed on the second deck zone such that the second surface is visible, an area on which the fourth type card object can be placed is limited to the second area. In other words, according to the present aspect, the area on which the fourth type card object can be placed changes depending on how the fourth type card object is placed on the second deck zone. For this reason, according to this aspect, in order to win the game, while considering whether the fourth type card object is to be placed on the second deck zone such that the first or second surface is visible, the first user is required to consider areas on which the first, second and third type card objects are to be placed. This requires strategies for the game.

In this aspect, the "fourth type card object" may be a card object that has a greater ability for the game than the "first type card object," or it may be a card object that has a greater rarity in the game than the "first type card object."

In this aspect, the fourth type card object may be placed on only a part of the second area.

APPENDIX 4

The recording medium according to another aspect of the present disclosure is a non-transitory computer readable recording medium in Appendix 3, in which the program causes the at least one processor to place the fourth type card object on the second deck zone such that the first surface is visible to the first user, based on a second effect (e.g., being forced to be moved) affecting the fourth type card object placed on the first area or the second area.

According to this aspect, depending on whether the first or second effect affects the fourth type card object, the mode of how the fourth type card object is placed on the second deck zone changes. Furthermore, according to this aspect, the area on which the fourth type card object can be placed changes depending on the mode of how the fourth type card object is placed on the second deck zone. For this reason, according to this aspect, in order to win the game, the first and second users are required to consider which effect should affect the fourth type card object between the first and second effects and when this effect should affect the fourth type card object. This requires strategies for the game.

APPENDIX 5

The recording medium according to another aspect of the present disclosure is a non-transitory computer readable recording medium in Appendix 3 or 4, in which, based on the second type card object being placed on the second area, the program causes the at least one processor to allow the fourth type card object, which is placed on the second deck zone such that the second surface is visible to the first user, to be placed on an area that is a part of the first area and is indicated by the second type card object placed on the second area, in response to a user input made by the first user.

According to this aspect, in response to the second type card object being placed on the second area, the area on which the fourth type card object can be placed such that the second surface is visible expands from the second area to both the first and second areas. For this reason, according to this aspect, in order to win the game, while considering whether the fourth type card object is to be placed on the first area, the first user is required to determine the placement of the second type card object on the second area.

Furthermore, according to this aspect, in order to win the game, while considering whether the fourth type card object is to be placed on the first area and whether the second type card object is to be placed on the second area, the first user is required to determine the placement of the first type card object on the first area and the placement of the third type card object on the second area. For this reason, according to this aspect, compared to the Reference Example, the first user is required to deeply consider areas on which the first, second, third, and fourth type card objects are to be placed in order to win the game. This requires strategies for the game.

APPENDIX 6

A recording medium according to one aspect of the present disclosure is a non-transitory computer readable recording medium (e.g., a memory 1002) having recorded therein a program (a control program PRGt) executed by at least one processor of a first terminal apparatus, the program causing the at least one processor to: receive a user input made by a first user for a competitive video game, the competitive video game using: a plurality of card objects to be manipulated by the first user of the first terminal apparatus; and a plurality of enemy card objects to be manipulated by a second user of a second terminal apparatus that is configured to communicate with the first terminal apparatus; place, on a first deck zone, a first type card object from among the plurality of card objects to be manipulated by the first user; place, on a second deck zone, a second type card object and a third type card object from among the plurality of card objects to be manipulated by the first user; allow the first type card object to be placed on a first area on which placement of the plurality of enemy card objects to be manipulated by the second user is not allowed, in response to a user input made by the first user; allow the second type card object placed on the second deck zone to be placed on a second area on which placement of at least one of the plurality of enemy card objects to be manipulated by the second user is allowed, in response to a user input made by the first user; and allow the third type object card placed on the second deck zone to be placed on the first area or the second area, in response to a user input made by the first user.

According to this aspect, the area in which the first type card object can be placed is limited to the first area, and the area in which the second type card object can be placed is limited to the second area. However, both the first and second areas are allowed as areas on which the third type card objects can be placed. For this reason, according to this aspect, the winner or loser of the game depends not only on the type and number of the multiple card objects to be manipulated by the first user, but also on the placement of each type of the multiple card objects to be manipulated by the first user. Thus, according to this aspect, compared to the Reference Example, the first user is required to consider more deeply the areas in which the first, second, and third type card objects are to be placed to win the game. This requires strategies for the game.

APPENDIX 7

A server apparatus according to one aspect of the present disclosure is a server apparatus configured to communicate with a first terminal apparatus and a second terminal apparatus, the server apparatus including: a memory that stores instructions and; at least one processor that implements the instructions to: receive a user input made by a first user for a competitive video game, the competitive video game using: a plurality of card objects to be manipulated by the first user of the first terminal apparatus; and a plurality of enemy card objects to be manipulated by a second user of the second terminal apparatus; place, on a first deck zone, a first type card object from among the plurality of card objects to be manipulated by the first user; place, on a second deck zone, a second type card object and a third type card object from among the plurality of card objects to be manipulated by the first user; allow the first type card object to be placed on a first area on which placement of the plurality of enemy card objects to be manipulated by the second user is not allowed, in response to a user input made by the first user; allow the second type card object placed on the second deck zone to be placed on a second area on which placement of at least one of the plurality of enemy card objects to be manipulated by the second user is allowed, in response to a user input made by the first user; and allow the third type object card placed on the second deck zone to be placed on the first area or the second area, in response to a user input made by the first user.

According to this aspect, the area in which the first type card object can be placed is limited to the first area, and the area in which the second type card object can be placed is limited to the second area. However, both the first and second areas are allowed as areas on which the third type card objects can be placed. For this reason, according to this aspect, the winner or loser of the game depends not only on the type and number of the multiple card objects to be manipulated by the first user, but also on the placement of each type of the multiple card objects to be manipulated by the first user. Thus, according to this aspect, compared to the Reference Example, the first user is required to consider more deeply the areas in which the first, second, and third type card objects are to be placed to win the game. This requires strategies for the game.

APPENDIX 8

A terminal apparatus according to one aspect of the present disclosure is a terminal apparatus including: a memory that stores instructions and; at least one processor that implements the instructions to: receive a user input made by a first user for a competitive video game, the competitive video game using: a plurality of card objects to be manipulated by the first user of the terminal apparatus; and a plurality of enemy card objects to be manipulated by a second user of another terminal apparatus that is configured to communicate with the terminal apparatus; place, on a first deck zone, a first type card object from among the plurality of card objects to be manipulated by the first user; place, on a second deck zone, a second type card object and a third type card object from among the plurality of card objects to be manipulated by the first user; allow the first type card object to be placed on a first area on which is not allowed to place the plurality of enemy card objects to be manipulated by the second user, in response to a user input made by the first user; allow the second type card object placed on the second deck zone to be placed on a second area on which placement of at least one of the plurality of enemy card objects to be manipulated by the second user is allowed, in response to a user input made by the first user; and allow the third type object card placed on the second deck zone to be placed on the first area or the second area, in response to a user input made by the first user.

According to this aspect, the area in which the first type card object can be placed is limited to the first area, and the area in which the second type card object can be placed is limited to the second area. However, both the first and second areas are allowed as areas on which the third type card objects can be placed. For this reason, according to this aspect, the winner or loser of the game depends not only on the type and number of the multiple card objects to be manipulated by the first user, but also on the placement of each type of the multiple card objects to be manipulated by the first user. Thus, according to this aspect, compared to the Reference Example, the first user is required to consider more deeply the areas in which the first, second, and third type card objects are to be placed to win the game. This requires strategies for the game.

APPENDIX 9

A control method for a server apparatus according to one aspect of the present disclosure is a computer-implemented control method for a server apparatus including: receiving a user input made by a first user for a competitive video game, the competitive video game using: a plurality of card objects to be manipulated by the first user of a first terminal apparatus that is configured to communicate with the server apparatus; and a plurality of enemy card objects to be manipulated by a second user of a second terminal apparatus that is configured to communicate with the server apparatus; placing, on a first deck zone, a first type card object from among the plurality of card objects to be manipulated by the first user; placing, on a second deck zone, a second type card object and a third type card object from among the plurality of card objects to be manipulated by the first user; allowing the first type card object to be placed on a first area on which placement of the plurality of enemy card objects to be manipulated by the second user is not allowed, in response to a user input made by the first user; allowing the second type card object placed on the second deck zone to be placed on a second area on which placement of at least one of the plurality of enemy card objects to be manipulated by the second user is allowed, in response to a user input made by the first user; and allowing the third type object card placed on the second deck zone to be placed on the first area or the second area, in response to a user input made by the first user.

According to this aspect, the area in which the first type card object can be placed is limited to the first area, and the area in which the second type card object can be placed is limited to the second area. However, both the first and second areas are allowed as areas on which the third type card objects can be placed. For this reason, according to this aspect, the winner or loser of the game depends not only on the type and number of the multiple card objects to be manipulated by the first user, but also on the placement of each type of the multiple card objects to be manipulated by the first user. Thus, according to this aspect, compared to the Reference Example, the first user is required to consider more deeply the areas in which the first, second and third type card objects are to be placed to win the game. This requires strategies for the game.

APPENDIX 10

A control method for a terminal apparatus according to one aspect of the disclosure is a computer-implemented control method for a terminal apparatus including: receiving a user input made by a first user for a competitive video game, the competitive video game using: a plurality of card objects to be manipulated by the first user of the terminal apparatus; and a plurality of enemy card objects to be manipulated by a second user of another terminal apparatus that is configured to communicate with the terminal apparatus; placing, on a first deck zone, a first type card object from among the plurality of card objects to be manipulated by the first user; placing, on a second deck zone, a second type card object and a third type card object from among the plurality of card objects to be manipulated by the first user, allowing the first type card object to be placed on a first area on which placement of the plurality of enemy card objects to be manipulated by the second user is not allowed, in response to a user input made by the first user; allowing the second type card object placed on the second deck zone to be placed on a second area on which placement of at least one of the plurality of enemy card objects to be manipulated by the second user is allowed, in response to a user input made by the first user; and allowing the third type object card placed on the second deck zone to be placed on the first area or the second area, in response to a user input made by the first user.

According to this aspect, the area in which the first type card object can be placed is limited to the first area, and the area in which the second type card object can be placed is limited to the second area. However, both the first and second areas are allowed as areas on which the third type card objects can be placed. For this reason, according to this aspect, the winner or loser of the game depends not only on the type and number of the multiple card objects to be manipulated by the first user, but also on the placement of each type of the multiple card objects to be manipulated by the first user. Thus, according to this aspect, compared to the Reference Example, the first user is required to consider more deeply the areas in which the first, second and third type card objects are to be placed to win the game. This requires strategies for the game.

DESCRIPTION OF REFERENCE SIGNS

1 . . . game system, 10 . . . terminal apparatus, 11 . . . terminal control section, 12 . . . memory section, 13 . . . communication section, 14 . . . input section, 15 . . . display section, 30 . . . server apparatus, 31 . . . server control section, 32 . . . memory section, 111 . . . data acquirer, 112 . . . display information generator, 1001 . . . processor, 1002 . . . memory, 1003 . . . communication device, 1004 . . . touch panel, 3001 . . . processor. 3002 . . . memory, 3003 . . . communication device.

What is claimed is:

1. A non-transitory computer readable recording medium having recorded therein a program executed by at least one processor of a server apparatus, the program causing the at least one processor to:

receive a user input made by a first user for a competitive video game, the competitive video game configured to generate a game image displaying a field of the competitive video game, the competitive video game using:
        a plurality of card objects to be manipulated by the first user of a first terminal apparatus that is configured to communicate with the server apparatus; and
        a plurality of enemy card objects to be manipulated by a second user of a second terminal apparatus that is configured to communicate with the server apparatus;
    place, on a first deck zone, a first type card object from among the plurality of card objects to be manipulated by the first user;
    place, on a second deck zone, a second type card object and a third type card object from among the plurality of card objects to be manipulated by the first user, wherein the second type card object comprises one or more link markers configured to indicate a direction corresponding to a position of an adjacent zone and/or area in the field;
    allow the first type card object to be placed on a first area on which placement of the plurality of enemy card objects to be manipulated by the second user is not allowed, in response to a user input made by the first user;
    allow the second type card object placed on the second deck zone to be placed on a second area limited to an initial zone of placement on which placement of at least one of the plurality of enemy card objects to be manipulated by the second user is allowed, in response to a user input made by the first user, wherein the initial zone of placement does not include the adjacent zone and/or area;
    allow the third type card object card placed on the second deck zone to be placed on the first area or the second area, in response to a user input made by the first user;
    render the one or more link markers to be one or more active link markers in response to a user input made by the first user, wherein the one or more active link markers are configured to transform the adjacent zone and/or area into the initial zone of placement; and
    transmit a command to at least one of the first terminal apparatus or the second terminal apparatus to cause one or more display sections associated therewith to:
        display the one or more link markers, the adjacent zone and/or area, and the field; and
        visually indicate the one or more active link markers rendered in response to the user input made by the first user.

2. The non-transitory computer readable recording medium according to claim 1, wherein, based on the second type card object being placed on the second area, the program causes the at least one processor to allow the second type card object to be placed on an area that is a part of the first area and is indicated by the second type card object placed on the second area, in response to a user input made by the first user.

3. The non-transitory computer readable recording medium according to claim 1, wherein the program causes the at least one processor to:

place, on the second deck zone, a fourth type card object from among the plurality of card objects to be manipulated by the first user such that a first surface of two surfaces included in the fourth type card object is visible to the first user;
    allow the fourth type card object, which is placed on the second deck zone such that the first surface is visible to the first user, to be placed on the first area or the second area, in response to a user input made by the first user;
    allow the fourth type card object, which is placed on the second deck zone such that a second surface of the two surfaces included in the fourth type card object is visible to the first user, to be placed on the second area, in response to a user input made by the first user; and
    place the fourth type card object on the second deck zone such that the second surface is visible to the first user, based on a first effect affecting the fourth type card object placed on the first area or the second area.

4. The non-transitory computer readable recording medium according to claim 3, wherein the program causes the at least one processor to place the fourth type card object on the second deck zone such that the first surface is visible to the first user, based on a second effect affecting the fourth type card object placed on the first area or the second area.

5. The non-transitory computer readable recording medium according to claim 3, wherein-, based on the second type card object being placed on the second area, the program causes the at least one processor to allow the fourth type card object, which is placed on the second deck zone such that the second surface is visible to the first user, to be placed on an area that is a part of the first area and is indicated by the second type card object placed on the second area, in response to a user input made by the first user.

6. The non-transitory computer readable recording medium according to claim 1, wherein the one or more display sections is further configured to visually indicate the one or more active link markers rendered in response to the user input made by the first user by displaying the one or more active link markers as black.

7. A non-transitory computer readable recording medium having recorded therein a program executed by at least one processor of a first terminal apparatus, the program causing the at least one processor to:

receive a user input made by a first user for a competitive video game, the competitive video game configured to generate a game image displaying a field of the competitive video game, the competitive video game using:

a plurality of card objects to be manipulated by the first user of the first terminal apparatus; and a plurality of enemy card objects to be manipulated by a second user of a second terminal apparatus that is configured to communicate with the first terminal apparatus;

place, on a first deck zone, a first type card object from among the plurality of card objects to be manipulated by the first user;

place, on a second deck zone, a second type card object and a third type card object from among the plurality of card objects to be manipulated by the first user, wherein the second type card object comprises one or more link markers configured to indicate a direction corresponding to a position of an adjacent zone and/or area in the field;

allow the first type card object to be placed on a first area on which placement of the plurality of enemy card objects to be manipulated by the second user is not allowed, in response to a user input made by the first user;

allow the second type card object placed on the second deck zone to be placed on a second area limited to an initial zone of placement on which placement of at least one of the plurality of enemy card objects to be manipulated by the second user is allowed, in response to a user input made by the first user, wherein the initial zone of placement does not include the adjacent zone and/or area; and allow the third type card object placed on the second deck zone to be placed on the first area or the second area, in response to a user input made by the first user; and render the one or more link markers to be one or more active link markers in response to another user input made by the first user, wherein the one or more active link markers are configured to transform the adjacent zone and/or area into the initial zone of placement, wherein at least one of the first terminal apparatus or the second terminal apparatus comprises one or more display sections configured to:

display the one or more link markers, the adjacent zone and/or area, and the field, and visually indicate the one or more active link markers rendered in response to the another user input made by the first user.

8. The non-transitory computer readable recording medium according to claim 7, wherein the one or more display sections is further configured to visually indicate the one or more active link markers rendered in response to the user input made by the first user by displaying the one or more active link markers as black.

9. A computer-implemented control method for a server apparatus comprising:

receiving a user input made by a first user for a competitive video game, the competitive video game configured to generate a game image displaying a field of the competitive video game, the competitive video game using:

a plurality of card objects to be manipulated by the first user of a first terminal apparatus that is configured to communicate with the server apparatus; and a plurality of enemy card objects to be manipulated by a second user of a second terminal apparatus that is configured to communicate with the server apparatus;

placing, on a first deck zone, a first type card object from among the plurality of card objects to be manipulated by the first user;

placing, on a second deck zone, a second type card object and a third type card object from among the plurality of card objects to be manipulated by the first user, wherein the second type card object comprises one or more link markers configured to indicate a direction corresponding to a position of an adjacent zone and/or area in the field;

allowing the first type card object to be placed on a first area on which placement of the plurality of enemy card objects to be manipulated by the second user is not allowed, in response to a user input made by the first user;

allowing the second type card object placed on the second deck zone to be placed on a second area limited to an initial zone of placement on which placement of at least one of the plurality of enemy card objects to be manipulated by the second user is allowed, in response to a user input made by the first user, wherein the initial zone of placement does not include the adjacent zone and/or area;

allowing the third type card object placed on the second deck zone to be placed on the first area or the second area, in response to a user input made by the first user;

rendering the one or more link markers to be one or more active link markers in response to another user input made by the first user;

allowing the one or more active link markers to transform the adjacent zone and/or area into the initial zone of placement;

displaying, on one or more display sections of at least one of the first terminal apparatus or the second terminal apparatus, the one or more link markers, the adjacent zone and/or area, and the field; and visually indicating, on the one or more display sections, the one or more active link markers rendered in response to the another user input made by the first user.

10. The computer-implemented control method for the server apparatus according to claim 9, wherein the visually indicating comprises displaying the one or more active link markers as black.

11. A computer-implemented control method for a terminal apparatus comprising:

receiving a user input made by a first user for a competitive video game, the competitive video game generating a game image displaying a field of the competitive video game, and using:

a plurality of card objects to be manipulated by the first user of the terminal apparatus; and a plurality of enemy card objects to be manipulated by a second user of another terminal apparatus that is configured to communicate with the terminal apparatus;

placing, on a first deck zone, a first type card object from among the plurality of card objects to be manipulated by the first user;

placing, on a second deck zone, a second type card object and a third type card object from among the plurality of card objects to be manipulated by the first user, wherein the second type card object comprises one or more link markers configured to indicate a direction corresponding to a position of an adjacent zone and/or area in the field;

allowing the first type card object to be placed on a first area on which placement of the plurality of enemy card objects to be manipulated by the second user is not allowed, in response to a user input made by the first user;

allowing the second type card object placed on the second deck zone to be placed on a second area limited to an initial zone of placement on which placement of at least one of the plurality of enemy card objects to be manipulated by the second user is allowed, in response to a user input made by the first user, wherein the initial zone of placement does not include the adjacent zone and/or area;

allowing the third type card object card placed on the second deck zone to be placed on the first area or the second area, in response to a user input made by the first user;

rendering the one or more link markers to be one or more active link markers in response to another user input made by the first user;

allowing the one or more active link markers to transform the adjacent zone and/or area into the initial zone of placement;

displaying, on one or more display sections of at least one of the terminal apparatus or the another terminal apparatus, the one or more link markers, the adjacent zone and/or area, and the field; and visually indicating, on the one or more display sections, the one or more active link markers rendered in response to the another user input made by the first user.

12. The computer-implemented control method for the terminal apparatus according to claim 11, wherein the visually indicating comprises displaying the one or more active link markers as black.

* * * * *